US012782512B2

(12) United States Patent
Dalbah et al.

(10) Patent No.: US 12,782,512 B2
(45) Date of Patent: Nov. 3, 2026

(54) SYSTEM, METHOD AND COMPUTER READABLE MEDIUM FOR AN ADAPTIVE-DIRECTIONAL TRANSFORMER FOR REAL-TIME MULTI-VIEW RADAR SEMANTIC SEGMENTATION

(71) Applicant: Mohamed bin Zayed University of Artificial Intelligence, Abu Dhabi (AE)

(72) Inventors: Yahia Dalbah, Abu Dhabi (AE); Jean Lahoud, Abu Dhabi (AE); Hisham Cholakkal, Abu Dhabi (AE)

(73) Assignee: Mohamed bin Zayed University of Artificial Intelligence, Abu Dhabi (AE)

( * ) Notice: Subject to any disclaimer, the term of this patent is extended or adjusted under 35 U.S.C. 154(b) by 420 days.

(21) Appl. No.: 18/397,370

(22) Filed: Dec. 27, 2023

(65) Prior Publication Data

US 2025/0116756 A1 Apr. 10, 2025

Related U.S. Application Data

(60) Provisional application No. 63/588,474, filed on Oct. 6, 2023.

(51) Int. Cl.
*G01S 7/41* (2006.01)
*G01S 13/52* (2006.01)
(Continued)

(52) U.S. Cl.
CPC .............. *G01S 7/417* (2013.01); *G01S 13/52* (2013.01); *G01S 13/931* (2013.01);
(Continued)

(58) Field of Classification Search
CPC .... G06V 20/70; G06V 10/82; G06V 10/7715; G06V 10/776; G06V 20/58; G01S 13/89;
(Continued)

(56) References Cited

U.S. PATENT DOCUMENTS 12,536,783 B2 * 1/2026 Chung .................. G06V 10/82
2020/0011968 A1 1/2020 Hammes et al.
(Continued)

FOREIGN PATENT DOCUMENTS

WO 2022/269415 A1 12/2022

OTHER PUBLICATIONS

Braun et al. ; Semantic Segmentation of Radar Detections using Convolutions on Point Clouds ; Journal of Physics: Conference Series ; 2021 ; 10 Pages.

*Primary Examiner* — An H Do
(74) *Attorney, Agent, or Firm* — Oblon, McClelland, Maier & Neustadt, L.L.P.

(57) ABSTRACT

An automotive control system and method, includes a radar sensor, attached to a vehicle body panel, for receiving radar signals having a frequency, and processing circuitry configured with neural network encoders for encoding multiple frames of Angle-Doppler (AD), Range-Doppler (RD), and Range-Angle (RA) feature maps from the radar signals, an adaptive-directional attention block to sample rows and columns and apply self attention after each sampling instance, and a RD decoder and a RA decoder that generate RD and RA probability maps. Each map is a colorized feature map, with each pixel color representing a predicted class label for objects. An object detection component identifies the objects, and an object distance analysis component predicts a distance to the identified objects. An object velocity component predicts a velocity of the identified objects.

20 Claims, 16 Drawing Sheets

(51) Int. Cl.

| | |
|---|---|
| ***G01S 13/931*** | (2020.01) |
| ***G06V 10/77*** | (2022.01) |
| ***G06V 10/776*** | (2022.01) |
| ***G06V 10/82*** | (2022.01) |
| ***G06V 20/58*** | (2022.01) |
| ***G06V 20/70*** | (2022.01) |

(52) U.S. Cl.
CPC ........ *G06V 10/7715* (2022.01); *G06V 10/776* (2022.01); *G06V 10/82* (2022.01); *G06V 20/58* (2022.01); *G06V 20/70* (2022.01)

(58) Field of Classification Search
CPC ........ G01S 13/931; G01S 13/52; G01S 7/417; G01S 13/584; G01S 2013/93273; G01S 13/582; G01S 2013/93271; G01S 2013/9316
See application file for complete search history.

(56) References Cited

U.S. PATENT DOCUMENTS

2022/0026568 A1 1/2022 Meuter et al.
2022/0108423 A1 4/2022 Sivaraj et al.

* cited by examiner

SYSTEM, METHOD AND COMPUTER READABLE MEDIUM FOR AN ADAPTIVE-DIRECTIONAL TRANSFORMER FOR REAL-TIME MULTI-VIEW RADAR SEMANTIC SEGMENTATION

CROSS-REFERENCE TO RELATED APPLICATIONS

This application claims the benefit of priority to provisional application No. 63/588,474 filed Oct. 6, 2023, the entire contents of which are incorporated herein by reference.

STATEMENT REGARDING PRIOR DISCLOSURE BY THE INVENTORS

Aspects of this technology are described in Dalbah, Yahia, Jean Lahoud, and Hisham Cholakkal. "TransRadar: Adaptive-Directional Transformer for Real-Time Multi-View Radar Semantic Segmentation." Published at *arXiv preprint arXiv:* 2310.02260 (2023) which is incorporated herein by reference in its entirety.

BACKGROUND

Technical Field

The present disclosure relates to an adaptive-directional transformer for real-time multi-view radar-based semantic segmentation, and in particular a deep learning transformer architecture and loss functions for radar perception.

Description of the Related Art

In computer vision, semantic segmentation is a deep learning algorithm that associates a label or category with every pixel in an image. It is used to recognize a collection of pixels that form distinct categories. For example, an autonomous vehicle typically includes a computer that can identify vehicles, pedestrians, traffic signs, pavement, and other road features.

Autonomous vehicles rely on information provided by various types of sensors about the environment around a vehicle and understanding what the information reveals through on-board computing, as well as help from remote computing. As remote computing requires a communication link, it is preferable to use the on-board computing. However, on-board computing in a vehicle requires features that are needed due to limitations in power, space, cooling, as well as weather conditions that are unique to vehicles. For example, there are limitations in electric power available in a vehicle. It is preferable to minimize power usage, to keep from taking away from power required for numerous systems in a vehicle, which is effectively off-grid, i.e., not connected to an electric power grid. There are limitations in space for accommodating a computing system to avoid encroaching into passenger space. A computer system incorporated in a vehicle will be exposed to a wide range of temperatures, and must have cooling that is sufficient for the computer system. In particular, computer systems with multi-core processors, multi-core graphic processing units, etc., have particular cooling requirements for desktop and laptop platforms, and much more so in vehicles subject to extreme temperatures. Moreover, an on-board vehicle computer system needs to be able to perform operations reliably despite being subject to humidity, hot and cold temperatures.

Thus, on-board vehicle computer systems require design considerations that take into account the unique conditions that occur in the case of a vehicle.

Still, there is a push for greater computing power for a vehicle to keep up with the growing demand for computer-based features. A challenge is to incorporate increased computer-based features, but keep within limitations associated with vehicle computing. On top of the growing demand for computer-based features, is the need to perform certain compute functions in real time, especially in the case of safety-related features. Safety-related features may compromise safety if computations are not within a time frame that is required to accommodate an action that ensures the safety feature. For example, a braking system implemented to use information sensed by visual sensors to actuate the brakes when the on-board computer determines that the vehicle is approaching too closely to another vehicle may have only a few seconds to make the determination and take appropriate action. A computer that takes too long to make a determination defeats the purpose of the braking system.

One approach is to move some compute functions to the cloud, as well as to perform some compute intensive functions in an edge computing layer, at the edge of the cloud. Edge computing off-loads computing from the cloud, as the cloud is also limited to the amount of compute resources. The approach to use edge computing and cloud services is steadily improving with the advent of 5G and later communication. 5G communication brings about reliable high-speed wireless data transfer. Still, in the case of real time safety related features, on-board computing may be the only viable option.

Safety-related automotive systems typically rely on radar sensing for most of the tasks that require deterministic distance measurements, such as collision avoidance, blind spot detection, and adaptive cruise control. The prevalence of radar sensors in these tasks has been attributed to their relatively low cost, low processing time, and ability to measure the velocity of objects.

On the other hand, LiDAR sensors have risen in popularity as the main automotive perception tool for autonomous driving due to their relatively higher resolution and ability to generate detailed point-cloud data. LiDAR is an acronym for Light Detection and Ranging. In LiDAR, laser light is sent from a source (transmitter) and reflected from objects in the scene. The reflected light is detected by the system receiver and the time of flight (TOF) is used to develop a distance map of the objects in the scene. The popularity LiDAR is particularly noticeable in recent development projects, where LiDAR sensors are dominantly used in object detection and semantic segmentation tasks.

However, LiDAR sensors suffer from drawbacks originating from the shorter wavelength of their signals. LiDAR sensors are highly prone to errors, weather fluctuations, and occlusion with raindrops and/or dust. See Di Feng, Christian Haase-Schütz, Lars Rosenbaum, Heinz Hertlein, Claudius Gläser, Fabian Timm, Werner Wiesbeck, and Klaus Dietmayer. Deep multi-modal object detection and semantic segmentation for autonomous driving: Datasets, methods, and challenges. *IEEE Transactions on Intelligent Transportation Systems,* 22 (3): 1341-1360, 2021. Moreover, LiDAR signals' higher frequencies result in a rapid attenuation of their strength with respect to distance traveled, which results in a maximum range of operation of 100 to 200 m. Furthermore, LiDAR signals require relatively high computing power.

Unlike LiDARs, frequency-modulated continuous wave radars operate in the millimeter wave band in which signals do not get significantly attenuated when faced with occlusions, allowing operation ranges of up to 3,000 m. Radars function reliably in adverse weather conditions more robustly than other commonly used sensing methods like cameras and LiDARs. Where LiDAR is used for information to determine distance, Radar signals themselves are rich in information as they contain Doppler information that includes the velocity of the objects.

The richness of radar signal information has motivated its usage not only in deterministic instrumentation but also for computer vision tasks. See Yizhou Wang, Zhongyu Jiang, Xiangyu Gao, Jenq-Neng Hwang, Guanbin Xing, and Hui Liu. Rodnet: Radar object detection using cross-modal supervision. In 2021 *IEEE Winter Conference on Applications of Computer Vision* (*WACV*), pages 504-513, 2021; and Ao Zhang, Farzan Erlik Nowruzi, and Robert Laganiere. Raddet: Range-azimuth-doppler based radar object detection for dynamic road users. In 2021 18*th Conference on Robots and Vision* (*CRV*), pages 95-102, 2021. The radar signals can be processed to be used in an image-like pipeline in the form of Range-Angle (RA), Range-Doppler (RD), and Angle-Doppler (AD) maps. These maps are sliced views of the total 3D Range-Angle-Doppler (RAD) cube, and obtaining any two combinations allows for the calculation of the third.

The task of semantic segmentation using raw/processed radar data has been a growing task in the radar perception community and has shown promising development in recent years. See Xiangyu Gao, Guanbin Xing, Sumit Roy, and Hui Liu. Experiments with mmwave automotive radar test-bed. In 2019 53*rd Asilomar Conference on Signals, Systems, and Computers*, pages 1-6, 2019; Tiezhen Jiang, Long Zhuang, Qi An, Jianhua Wang, Kai Xiao, and Anqi Wang. T-rodnet: Transformer for vehicular millimeter-wave radar object detection. *IEEE Transactions on Instrumentation and Measurement,* 72:1-12, 2023; Michael Meyer and Georg Kuschk. Automotive radar dataset for deep learning based 3d object detection. In 2019 16*th European Radar Conference* (*EuRAD*), pages 129-132, 2019; Farzan Erlik Nowruzi, Dhanvin Kolhatkar, Prince Kapoor, Fahed Al Hassanat, Elnaz Jahani Heravi, Robert Laganiere, Julien Rebut, and Waqas Malik. Deep open space segmentation using automotive radar. In 2020 *IEEE MTT-S International Conference on Microwaves for Intelligent Mobility* (*ICMIM*), pages 1-4, 2020; Arthur Ouaknine, Alasdair Newson, Julien Rebut, Florence Tupin, and Patrick Pérez. Carrada dataset: Camera and automotive radar with range-angle-doppler annotations. In 2020 25*th International Conference on Pattern Recognition* (*ICPR*), pages 5068-5075, 2021; Andras Palffy, Jiaao Dong, Julian F P Kooij, and Dariu M Gavrila. Cnn based road user detection using the 3d radar cube. *IEEE Robotics and Automation Letters,* 5 (2): 1263-1270, 2020; Ole Schumann, Markus Hahn, Nicolas Scheiner, Fabio Weishaupt, Julius F Tilly, Jürgen Dickmann, and Christian Wöhler. Radarscenes: A real-world radar point cloud data set for automotive applications. In 2021 *IEEE* 24*th International Conference on Information Fusion* (*FUSION*), pages 1-8. IEEE, 2021.

Nonetheless, segmenting radar images still poses a challenge due to the noisy and sparse nature of the data, as well as the high imbalance between the foreground and background. Also, despite the information-rich nature of radar data and the ability to obtain multiple views from a single sensing instance, most works do not utilize these benefits and tend to limit their approaches to Convolutional Neural Network (CNN) models on a single view, resulting in models that do not adequately capture global information from these single view maps.

Several approaches have used radar signals for perception tasks that are more commonly handled with camera images.

Low-cost frequency modulated continuous wave radars have been historically used in multiple applications involving machine learning and pattern recognition such as human activity and hand gesture recognition. See Guoqiang Zhang, Haopeng Li, and Fabian Wenger. Object detection and 3d estimation via an fmcw radar using a fully convolutional network. In *ICASSP* 2020-2020 *IEEE International Conference on Acoustics, Speech and Signal Processing* (*ICASSP*), pages 4487-4491. IEEE, 2020; Zhenyuan Zhang, Zengshan Tian, Ying Zhang, Mu Zhou, and Bang Wang. u-deephand: Fmcw radar-based unsupervised hand gesture feature learning using deep convolutional auto-encoder network. *IEEE Sensors Journal,* 19 (16): 6811-6821, 2019; and Zhenyuan Zhang, Zengshan Tian, and Mu Zhou. Latern: Dynamic continuous hand gesture recognition using fmcw radar sensor. *IEEE Sensors Journal,* 18 (8): 3278-3289, 2018. As mentioned above, in the context of automotive driving and in particular autonomous vehicles, LiDAR sensors are more popular with a common data output in the form of a point cloud. While multiple works have explored point-cloud fusion of radars and LiDARs, radar signals processing usually yields different physical representation than the LiDAR. See Kshitiz Bansal, Keshav Rungta, and Dinesh Bharadia. Radsegnet: A reliable approach to radar camera fusion. *arXiv preprint arXiv:* 2208.03849, 2022.

The low resolution and high sparsity of radar data make the point-cloud format and associated architectures unsuitable. While some datasets provide point-cloud radar data, some conventional approaches to radar processing use the full/split processed RAD tensors in the shape of 3D/2D image-like data. See Dan Barnes, Matthew Gadd, Paul Murcutt, Paul Newman, and Ingmar Posner. The oxford radar robotcar dataset: A radar extension to the oxford robotcar dataset. In *Proceedings of the IEEE International Conference on Robotics and Automation* (*ICRA*), Paris, 2020. Common radar datasets provide either a single view of the data (either RA or RD), the original raw and unprocessed radar signals, or the full RAD tensors. See Rebut et al.; Yizhou Wang et al.; Arthur Ouaknine, Alasdair Newson, Patrick Pérez, Florence Tupin, and Julien Rebut. Multi-view radar semantic segmentation. In *Proceedings of the IEEE/CVF International Conference on Computer Vision*, pages 15671-15680, 2021. RAD tensors provide cohesive information of the radar data; however, it is often undesirable to use 3D data due to the increased complexity of models when associated with the density of radar data, especially when taking multiple frames from the temporal domain.

Even with the recent emergence of radar datasets, few methods have been proposed for semantic segmentation and object detection. While common methods for image semantic segmentation can be employed, such as UNet and DeepLabv3+, these methods are not tailored to the noisy and sparse nature of radar images. See O. Ronneberger, P. Fischer, and T. Brox. U-net: Convolutional networks for biomedical image segmentation. In *Medical Image Computing and Computer-Assisted Intervention* (*MICCAI*), volume 9351 of LNCS, pages 234-241. Springer, 2015. (available on arXiv:1505.04597 [cs.CV]); and Liang-Chieh Chen, Yukun Zhu, George Papandreou, Florian Schroff, and Hartwig Adam. Encoder-decoder with atrous separable convolution for semantic image segmentation. In *Proceedings of the European conference on computer vision* (*ECCV*), pages 801-818, 2018.

Some recent and relevant works that process radar data include TMVANet, RAMP-CNN, T-RODNet, and PeakConv. TMVANet is a multi-view method that is composed of an encoding block, a latent-space processing, and a decoding block. It fully consists of convolutional layers and presents a strong baseline for predictions in RD and RA maps on the CARRADA dataset. RAMP-CNN is a CNN-based model that was mainly designed for processing 3D RAD tensors but was re-purposed for this dataset. See Xiangyu Gao, Guanbin Xing, Sumit Roy, and Hui Liu. Ramp-cnn: A novel neural network for enhanced automotive radar object recognition. *IEEE Sensors Journal,* 21 (4): 5119-5132, 2021. T-RODNet is a model utilizing Swin Transformers but does not produce RD predictions and operates only on RA inputs. See Jiang et al.; and Ze Liu, Yutong Lin, Yue Cao, Han Hu, Yixuan Wei, Zheng Zhang, Stephen Lin, and Baining Guo. Swin transformer: Hierarchical vision transformer using shifted windows. In *Proceedings of the IEEE/CVF International Conference on Computer Vision* (*ICCV*), 2021. T-RODNet shows improved RA scores. PeakConv applies the convolution operation with a receptive field consisting of the peaks of the signal. See Liwen Zhang, Xinyan Zhang, Youcheng Zhang, Yufei Guo, Yuanpei Chen, Xuhui Huang, and Zhe Ma. Peakconv: Learning peak receptive field for radar semantic segmentation. In *Proceedings of the IEEE/CVF Conference on Computer Vision and Pattern Recognition*, pages 17577-17586, 2023. While the approach in PeakConv achieves improved segmentation performance compared to TMVA-Net, it also increases the number of parameters.

Sparse variants of attention have been proposed in the literature. ReLA replaces the softmax activation with ReLu to achieve sparsity in attention and uses layer normalization to improve translation tasks. See Shuangjie Xu, Rui Wan, Maosheng Ye, Xiaoyi Zou, and Tongyi Cao. Sparse cross-scale attention network for efficient lidar panoptic segmentation. In *Proceedings of the AAAI Conference on Artificial Intelligence*, volume 36, pages 2920-2928, 2022. The sparsity can range from switching off attention to applying attention to all the input. On the other hand, the disclosed method learns the offsets to which the attention is applied and targets consistent efficiency for the radar segmentation task. Other sparse attention methods, such as NPA and SCAN address point clouds, which are sparse in nature. See Ruixiang Xue, JianqiangWang, and Zhan Ma. Efficient lidar point cloud geometry compression through neighborhood point attention. *arXiv preprint arXiv:* 2208.12573, 2022; and Biao Zhang, Ivan Titov, and Rico Sennrich. Sparse attention with linear units. *arXiv preprint arXiv:* 2104.07012, 2021.

At least the TMVANet model can yield state-of-the-art results in radar semantic segmentation on the CARRADA dataset. Nonetheless, the TMVANet model, as well as the other approaches for radar data, have limitations pertaining to the nature of the implementation and the task. First, the various approaches are limited to convolution layers that learn local spatial information of the multi-input data. While increasing the number of feature maps at every layer would slightly improve the accuracy of these approaches, it imposes a large computation burden. This impedes the model from further improving without increasing the number of parameters with the majority of parameters being employed in the convolutional layers. The second limitation is the ability of these models to learn and retain information from other maps. TRODNet processes RA maps only, while TMVA-Net concatenates all feature maps in the bottleneck along with the ASPP outputs. For the rest of the model, all combined feature maps are treated as a single set of feature maps coming from one source that gets split into two prediction heads.

Another important aspect to be considered in these approaches is the number of parameters. TMVA-Net produces multi-view results with 50× less parameters than TRODNet. Lastly, all reported models were trained using the combination of losses which are not optimally designed for the task of radar semantic segmentation.

Accordingly, it is one object of the invention to provide an automated radar perception model through sliced radar RAD tensors. Another still further object is to simultaneously predict the RD and RA semantic segmentation maps. A further object is to learn to select important locations in the radar map dense grid.

SUMMARY

Aspects of the present disclosure include an automotive control system, that can include at least one radar sensor, attached to a vehicle body panel, for receiving radar signals having a frequency; processing circuitry configured with a plurality of neural network encoders for encoding multiple frames of Angle-Doppler (AD), Range-Doppler (RD), and Range-Angle (RA) feature maps from the radar signals; an adaptive-directional attention block to sample rows and columns and apply self attention after each sampling instance; a RD decoder and a RA decoder that generate RD and RA probability maps, wherein each map is a colorized feature map, with each pixel color representing a predicted class label for a plurality of objects; an object detection component to identify the objects; an object distance analysis component to predict a distance to the identified objects.

Further aspects of the present disclosure include a non-transitory computer-readable storage medium including computer executable instructions, wherein the instructions, when executed by a computer, cause the computer to perform a method for semantic segmentation in radar acquired image frames, the method can include receiving multiple frames of radar signals having a frequency; encoding, by neural network encoders, multiple frames of Angle-Doppler (AD), Range-Doppler (RD), and Range-Angle (RA) feature maps from the radar signals; sampling, in an adaptive-directional attention block, rows and columns and applying self attention after each sampling instance; generating, by a RD decoder and a RA decoder, RD and RA probability maps, wherein each map is a colorized feature map, with each pixel color representing a predicted class label for a plurality of objects; identifying the objects; and predicting a distance to the identified objects.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

Figure 1B:
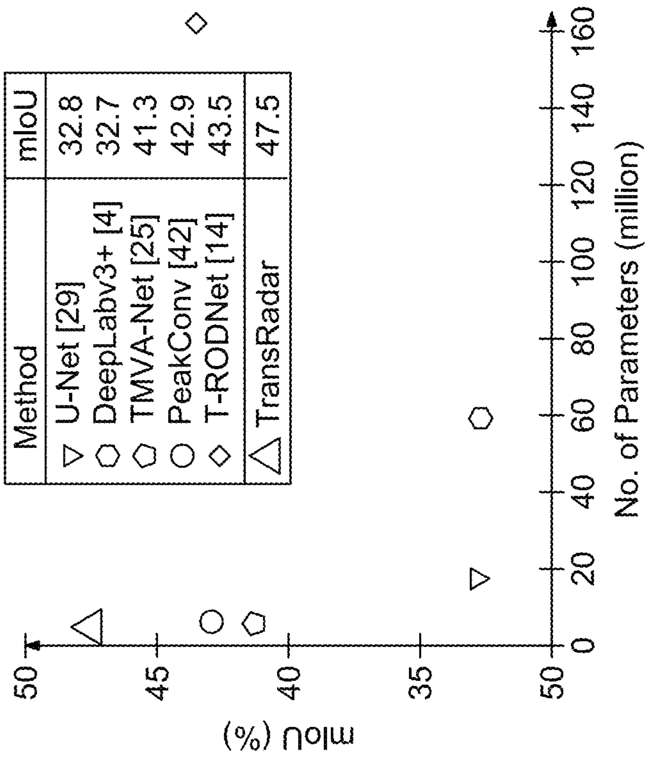
FIGS. 1A-1B. are a graph of mIoU scores vs No. of Parameters (millions) of state-of-the-art models in semantic segmentation on the CARRADA dataset.

In the drawings, like reference numerals designate identical or corresponding parts throughout the several views. Further, as used herein, the words "a," "an" and the like generally carry a meaning of "one or more," unless stated otherwise.

Aspects of this disclosure are directed to a system, device, and method for an attention-based approach to semantic segmentation using radar data signals. The approach produces a deep learning model that minimizes the number of tokens to keep the model fast and small and takes into consideration the sparse nature of the radar data. The model incorporates an attention block and a loss function that is tailored specifically for the task of radar learning.

The approach extends the definition of attention models to apply attention to adaptively sampled variations of input feature maps, tackling the sparse nature of radar data. The adaptability nature of the attention block allows it to attend to multiple views of the Range-Angle-Doppler (RAD) cube in an efficient way.

The approach combines the model with a loss function tailored to sparse and highly imbalanced radar data. The loss function is a combination of class-agnostic, multi-class, and multi-view consistency losses. The multi-view range matching loss addresses the drawbacks of fused multi-view inputs.

Figure 1A:
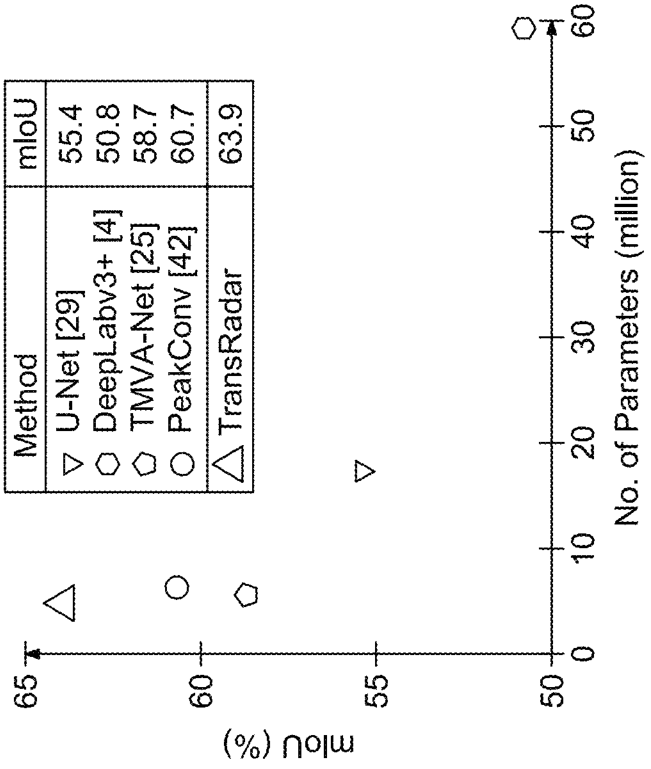

The attention-based approach to semantic segmentation using radar data signals is particularly well suited for automotive radar sensing and outperforms previous state-of-the-art works and sets new top scores in the reported metrics FIGS. 1A and 1B are graphs illustrating mIoU scores vs No. of Parameters (millions) of state-of-the-art models in semantic segmentation performed on the CARRADA dataset.

Intersection over Union (IOU) is a performance metric used to evaluate the accuracy of annotation, segmentation, and object detection algorithms. The metric can be computed as a mean Intersection-Over-Union (mIoU) metric. IoU=true_positives/(true_positives+false_positives+false_negatives).

The disclosed method, referred to as TransRadar, outperforms previous state-of-the-art methods in the semantic segmentation task with an mIoU of 63.9% for RD maps and 47.5% for RA maps.

With an ultimate goal of achieving autonomous vehicles, vehicles are being equipped with various advanced driver assistance safety systems (ADAS). These systems are designed to keep the driver and passengers safe on the road.

Figure 2:
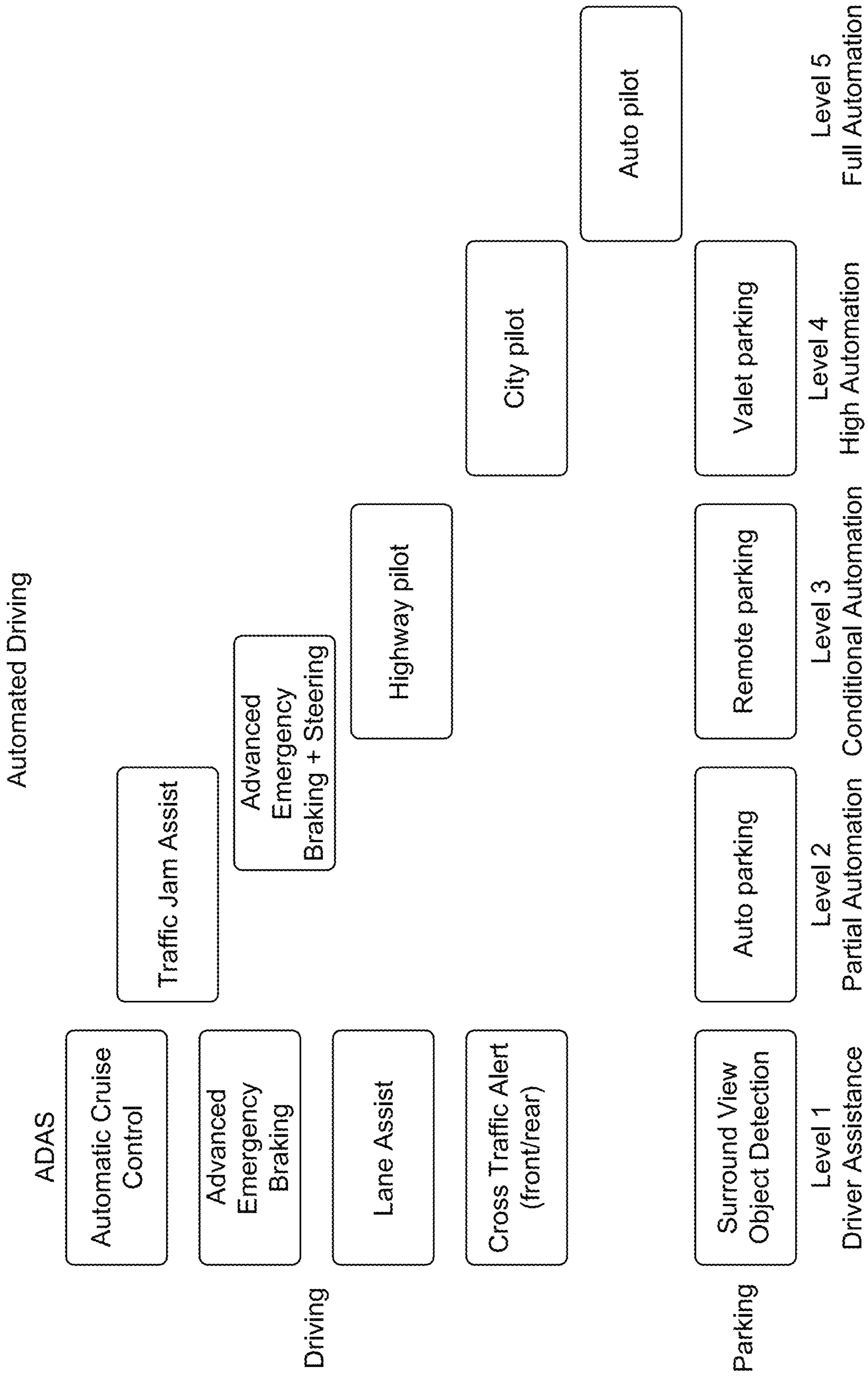
FIG. 2 illustrates levels of automation in vehicles.

To put ADAS into perspective, FIG. 2 is a diagram of levels of automation that have been defined for vehicles. Level 0 is momentary drive assistance, where a driver is fully responsible for driving the vehicle while a control system provides momentary driving assistance, like warnings and alerts, or emergency safety interventions. Level 1 is driver assistance, where the driver is fully responsible for driving the vehicle while a control system provides continuous assistance with either acceleration/braking or steering. Level 1 can include automatic cruise control, advanced emergency braking, lane assist, and cross traffic alert (front/read), as well as surround view object detection. Level 2 is additional driver assistance (partial automation), where the driver is fully responsible for driving the vehicle while a control system provides continuous assistance with both acceleration/braking and steering. Level 2 can include automatic parking. Level 3 is conditional automation, where the control system handles all aspects of driving while a driver remains available to take over driving if the control system can no longer operate. Level 4 is high automation, where when engaged, the control system is fully responsible for driving tasks within limited service areas. A human driver is not needed to operate the vehicle. Level 5 is full automation (auto pilot), where when engaged, the control system is fully responsible for driving tasks under all conditions and on all roadways. A human driver is not needed to operate the vehicle.

Figure 3:
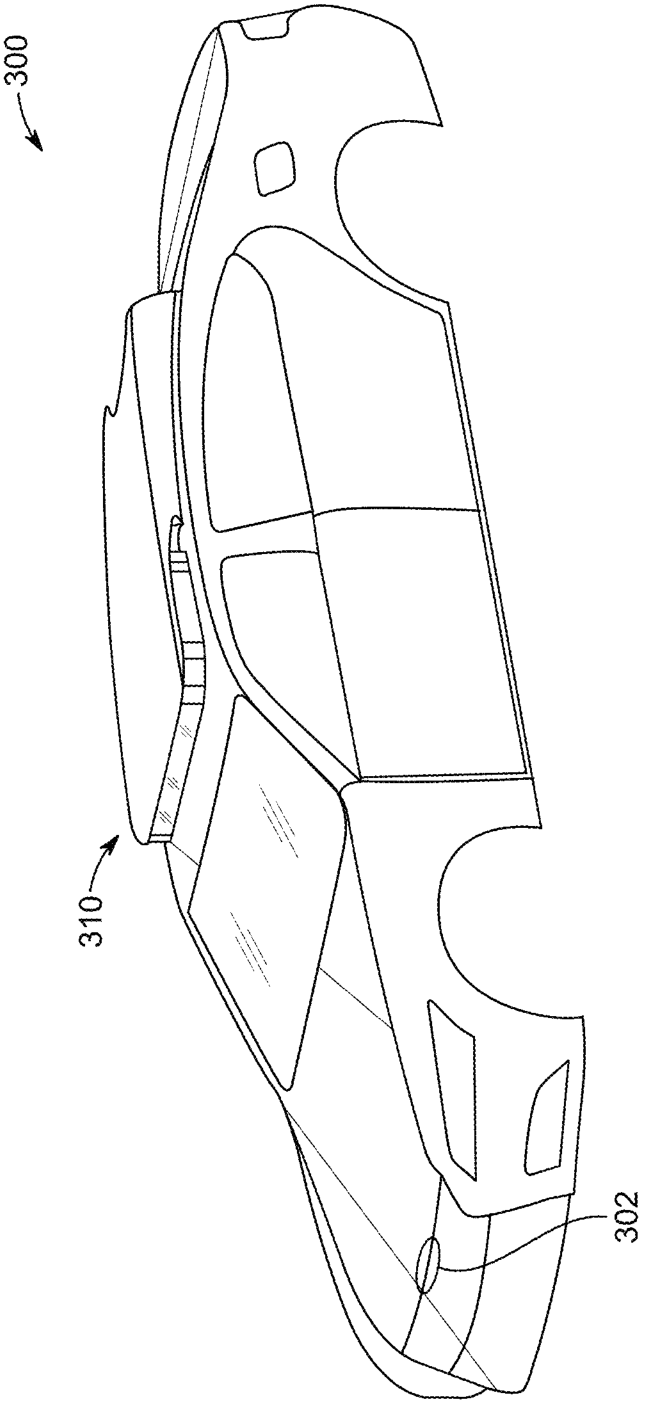
FIG. 3 is a schematic diagram of a vehicle equipped with advanced driver assist features.

FIG. 3 is a schematic diagram of a non-limiting example of a vehicle equipped with driver assist features. A vehicle 300 equipped with ADAS includes a combination of various sensors. In some embodiments, external environment sensors are provided as a roof mounted sensor array 310. In some embodiments, sensors are mounted at positions on the vehicle body. One equipment that may be part of ADAS is a forward-facing radar 302 to scan the environment in front of the vehicle 300. In one embodiment, a radar is mounted to face behind the vehicle 300. In one embodiment, several radar devices may be mounted around the perimeter of the vehicle 300.

In one embodiment, the forward-facing radar 302 may be located at the middle in a forward section of the vehicle body. While most ADASs only use one radar, some ADASs may utilize two or more forward-facing radars.

The forward-facing radar 302 may primarily be part of a system to control the distance of the vehicle from objects ahead. However, it may serve other roles. For example, the front-facing radar 302 may serve a role to indicate movement of objects ahead. The control system may produce one or more warnings of an eminent object movement before intervening and correcting the vehicle to avoid the object.

Two types of radar are used for autonomous vehicular applications, including impulse radar and frequency-modulated continuous wave (FMCW) radar. In impulse radar, one pulse is emitted from the radar device and the frequency of the signal remains constant throughout the operation. In FMCW radar, pulses are emitted continually. Pulses are modulated over the entire operation and the frequency varies over the transmission time. A FMCW radar system measures both distance and velocity of objects.

Figure 4:
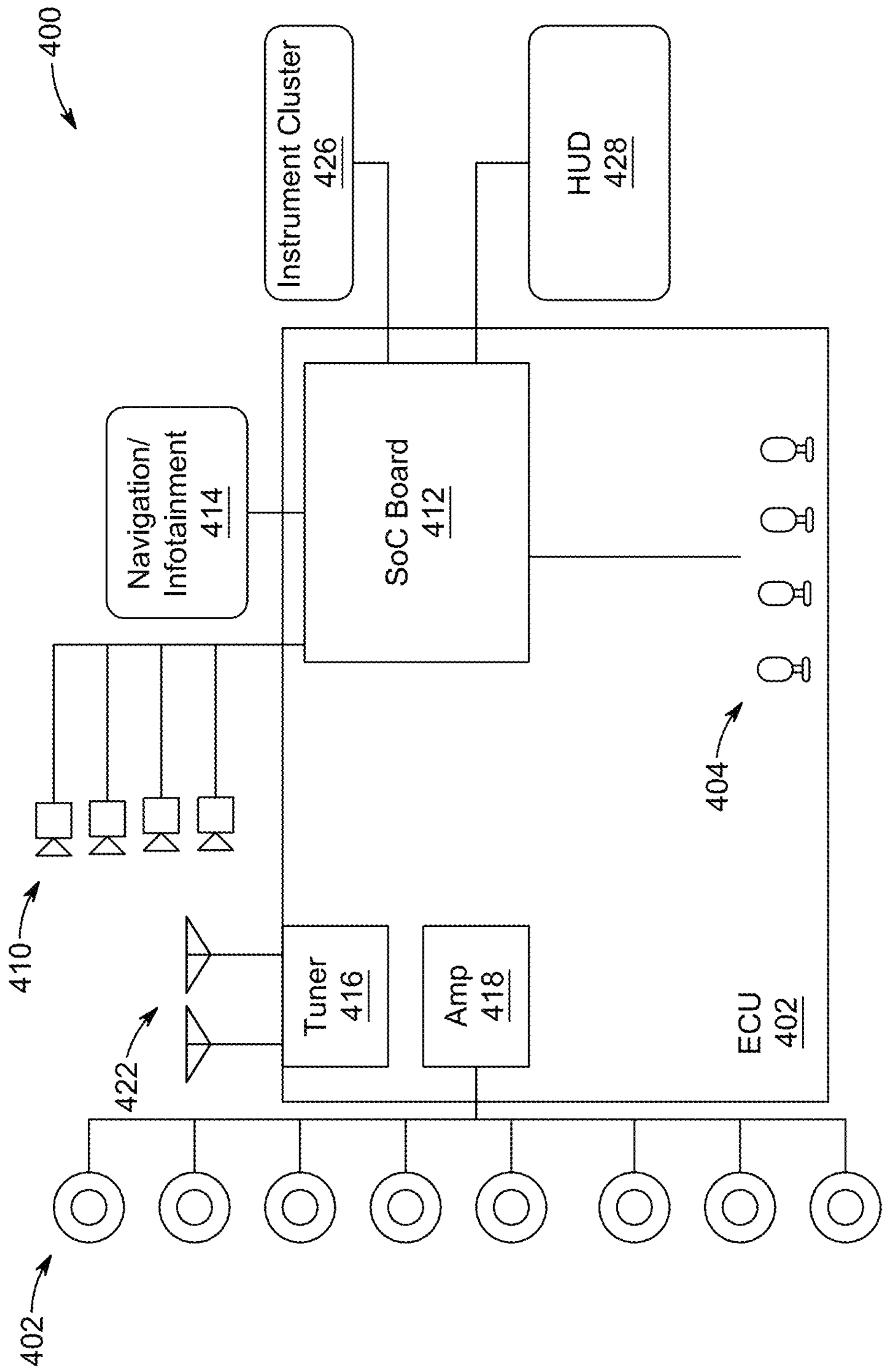
FIG. 4 is non-limiting exemplary driver assist system of a vehicle.

FIG. 4 is a non-limiting block diagram of a vehicle control system for a multi-sensor equipped vehicle. The control system 400 may be used for any of levels 0 to 5. The control system 400 includes sensors such as a number of radar sensors 402, for example FMCW radars, antennas 422, video cameras 410, microphones 404. An electronic control unit (ECU) 402, also referred to a vehicle controller, can include a tuner 416 and Amp 418, and a system on chip (SoC) 412. The SoC 412 can be connected to an infotainment cluster 414, instrument cluster 426, and head up display (HUD) 428.

In disclosed embodiments, the vehicle control system 400 is configured with a machine vision system. A machine vision system can be implemented as part of the SoC 412 and can accommodate various types of vision tasks, including image recognition, object detection, and semantic segmentation. As defined above semantic segmentation is a computer vision task that involves identifying and separating individual objects within an image, including detecting the boundaries of each object.

Semantic segmentation is an important feature for autonomous driving. More importantly, to be effective, semantic segmentation must be performed in real time while a vehicle is being driven.

Computations for semantic segmentation on a continuous basis in a moving vehicle is an enormous task, especially when the computations need to be done in an extremely limited period of time. One solution can be to offload semantic segmentation to a cloud service. This solution may be adequate for one or a few vehicles. However, such a solution may not be sufficient when the number of vehicles becomes large, for example, on the order of hundreds or thousands of vehicles. An alternative solution can be to perform autonomous vehicle computations in edge computing devices, or a combination of local computing and edge computing. Edge computing is benefiting from advances in cellular communication for communication with external devices and with other vehicles. Cellular communication enables data transfer, where 5G communication is expanded to more areas allowing for greater reliability in data transfer. 6G cellular communication will bring about even greater coverage and transfer rates for data. However, reliability and speed may still be better served by way of performing as much autonomous vehicle computation with an on-board computer system as practical, with less critical computations being performed in edge computing devices.

In disclosed embodiments, the SoC 412 of the vehicle control system 400 is configured with an object detection operation component to identify the objects, an object distance analysis component to predict a distance to the identified objects, and an object velocity analysis component to predict a velocity of the identified objects.

Figure 5:
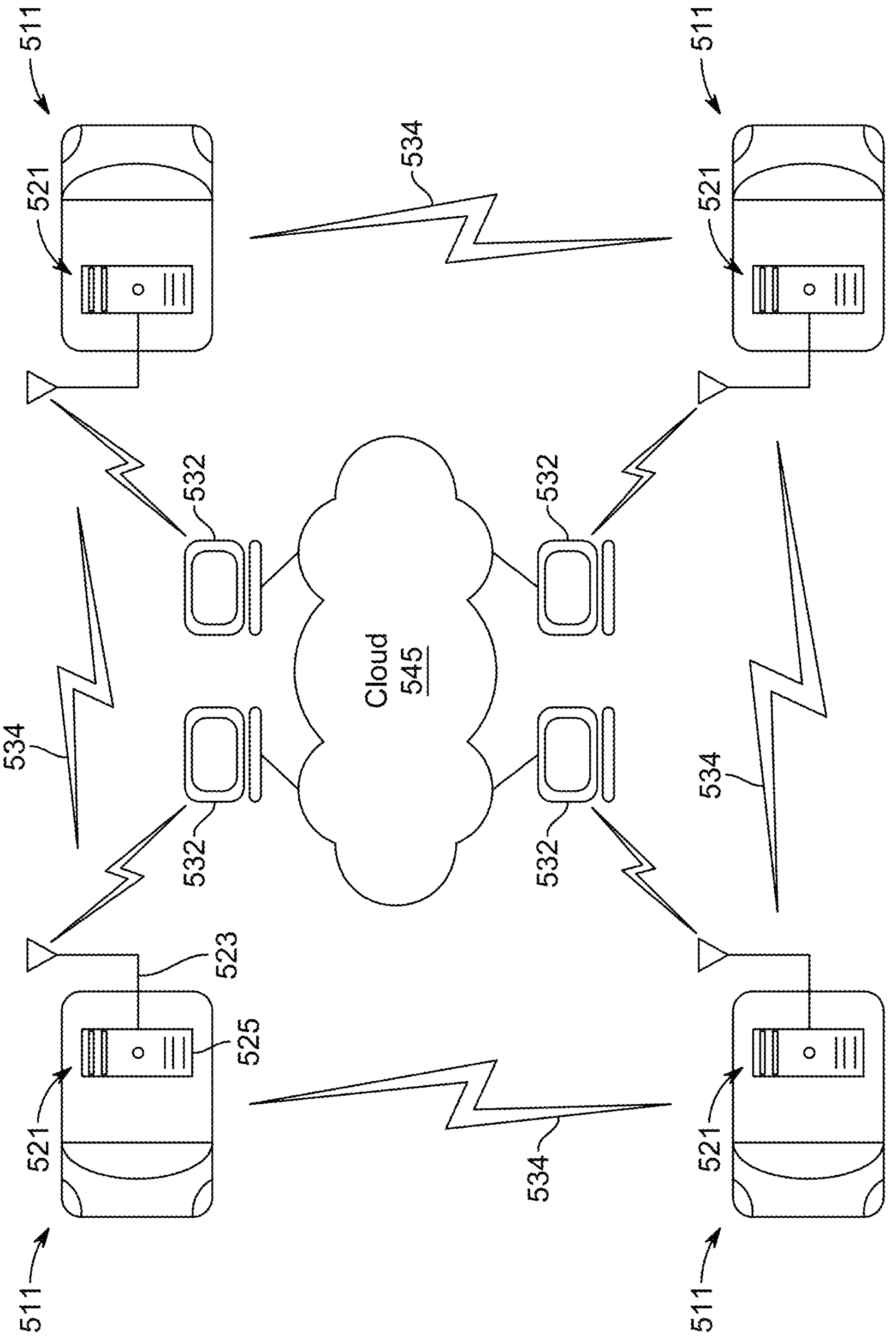
FIG. 5 is a system diagram of a vehicle control configuration that includes edge computing devices.

FIG. 5 is a system diagram of a vehicle control configuration that includes edge computing devices. For purposes of simplicity, the system diagram shows four vehicles 511 and four edge computing devices 532. However, it should be understood that there may be any number of vehicles and edge computing devices. Also, the cloud service 545 may include distributed data centers dispersed over a wide region. In addition, edge computing devices may be fixed or mobile computing devices.

Each vehicle 511 is equipped with a computing device 521 and communication equipment 525 and associated antenna 523. The communication equipment 525 is such that vehicles 511 can communicate with each other and can communicate with remote computing devices including a cloud service 545, as well as edge computing devices 532. The communication 534 with other vehicles and remote computing devices may be by way of cellular communication through base stations (not shown) or other wireless communication, such as WiFi.

Autonomous vehicle control can be performed in a vehicle computer system 521, in a cloud service 545, in an edge computing device 532, or a combination thereof. For purposes of this disclosure, the computation of semantic segmentation, i.e., training and inferencing using TransRadar, has been optimized such that it can be performed in the on-board vehicle computer system 521. In one embodiment, the TransRadar is trained on a computer workstation having a single graphics processing unit (GPU) as a software program using the PyTorch library. An example of a platform for autonomous vehicles (also referred to as self-driving vehicles) is the NVIDIA Drive software and hardware package.

As noted above, the TMVA-Net model can yield state-of-the-art results in radar semantic segmentation. Thus, TVMVA-Net is selected as a baseline for semantic segmentation. TMVA-Net encodes the RA, RD, and AD input maps to reduce the input size to one-fourth of its original resolution. Each output is then passed into an Atrous Spatial Pyramid Pooling (ASPP) block, and is also concatenated into a single feature maps holder. See Liang-Chieh Chen, George Papandreou, Iasonas Kokkinos, Kevin Murphy, and Alan L Yuille. Deeplab: Semantic image segmentation with deep convolutional nets, atrous convolution, and fully connected crfs. *IEEE transactions on pattern analysis and machine intelligence,* 40(4):834-848, 2017, incorporated herein by reference in its entirety. Both the ASPP output and the concatenation are then passed into a two-branches (RA and RD) decoding space that produces prediction maps. TMVA-Net uses a combination of three loss functions: a weighted Cross-Entropy loss, where the weights correspond to the frequency of classes in the dataset, a weighted Soft Dice loss, and a coherence loss. The coherence loss is a mean-square error of the RD and RA outputs to ensure coherence of predictions from different views.

Figure 6:
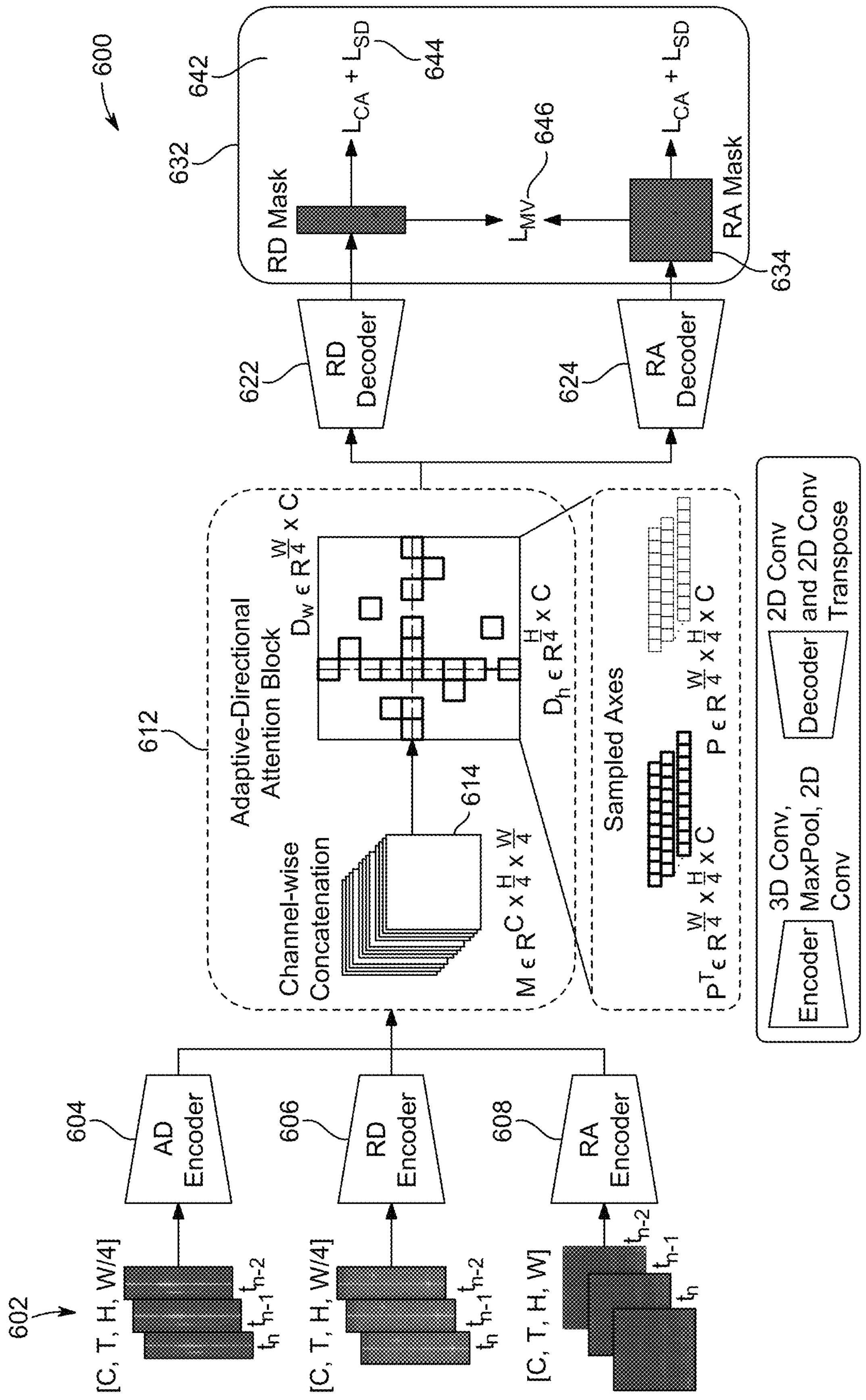
FIG. 6 is a flow diagram of a method for radar semantic segmentation.

FIG. 6 is a flow diagram of a lightweight attention-based neural network architecture, which addresses the limitations of the previous works. The lightweight architecture addresses the limitations by way of an adaptive-directional attention block that efficiently captures information from a sparse receptive field and simultaneously handles the multi-input multi-output nature of radar data. The lightweight architecture introduces a loss function for radar semantic segmentation that is tailored to address the inherent main drawbacks of radar data. The drawbacks include the noisy and sparse nature of radar signals and the disproportional level of background/foreground objects. The lightweight architecture achieves state-of-the-art results that are superior to TMVA-Net in radar semantic segmentation, as well as in the object detection task.

The lightweight architecture starts by using a similar encoding module as the one used in TMVA-Net, with $x_i \in \mathcal{R}^{1\times T\times H\times W}$ 602 where $x_i$ is an RA, RD, or AD feature map, T is the number of past frames taken from the range $[t_0-T, t_0]$, and H and W are the height and width of the radar frequency map, respectively. See Ouaknine et al. (*Proceedings of the IEEE/CVF International Conference on Computer Vision*, incorporated herein by reference). The feature maps generated from the encoders 604, 606, 608 are expressed as $x_{en} \in \mathcal{R}^{C\times H_d\times H_d}$, where $x_{en}$ is an encoded feature map, C is the number of feature maps, and $H_d$ and $W_d$ are the downsampled heights and widths, respectively. The produced feature maps are then channel-wise concatenated 614 into a single latent space that constitutes the input to the adaptive-directional attention block 612. In conventional convolution-based methods, it has been determined that reducing the feature maps below 128 channels in the latent bottleneck greatly reduces the mIoU. Thus, an attention-based approach is adopted that achieves similar scores but with smaller feature maps.

Contrary to conventional attention-based approaches in radar perception, convolutional layers or heavy positional embeddings are not needed. Instead, light is shed on the way the dataset is constructed, where the multi-view input has implicit information that can be shared across axes and channels. FIG. 6 illustrates the operation mechanism of the adaptive-directional attention block 612 after the concatenation 614 of the inputs' encoding.

2. Adaptive-Directional Attention

In the disclosed lightweight architecture, an adaptive-directional attention block 612 is the backbone of the architecture. A concept related to sampling straight-vector axes was previously proposed in the literature. See Jonathan Ho, Nal Kalchbrenner, Dirk Weissenborn, and Tim Salimans. Axial attention in multidimensional transformers. *arXiv preprint arXiv:* 1912.12180, 2019; Zilong Huang, Xinggang Wang, Lichao Huang, Chang Huang, Yunchao Wei, and Wenyu Liu. Ccnet: Criss-cross attention for semantic segmentation. In *Proceedings of the IEEE/CVF International Conference on Computer Vision*, pages 603-612, 2019; and Huiyu Wang, Yukun Zhu, Bradley Green, Hartwig Adam, Alan Yuille, and Liang-Chieh Chen. Axial-deeplab: Standalone axial-attention for panoptic segmentation. In *Computer Vision-ECCV* 2020: 16*th European Conference, Glasgow, UK, Aug.* 23-28, 2020, *Proceedings, Part IV*, pages 108-126. Springer, 2020, each incorporated herein by reference in their entirety. As an improvement, the adaptive-directional attention 612 tackles the sparse nature of radar data by utilizing attention that can extend further than single-column/row attention.

Subsequently, the attention 612 ensures a comprehensive outlook of the information space while being computationally efficient. For a 2D input image of shape $C \times H_d \times W_d$, there are two attention variations, one of the shape $H_d \times W_d \times C$ and another of the shape $W_d \times H_d \times C$. For example, for a width $W_d$, there are $W_d$ sampled vectors of size $H_d \times C$. The rationale behind incorporating the channels in the sampling traces back to the rich information provided by the radar data's feature maps. Axes are sampled by employing vertical and horizontal iteration limits of sizes $k_h$ and $k_w$, respectively. The horizontal and vertical shifts, $\Delta_h$ and $\Delta_w$, are defined that constitute the offset limits of sampling. Lastly, learnable parameters $\theta_h$ and $\theta_w$ are defined that perform a modulating operation to limit the effect of noise seen in data, allowing the model to learn to suppress insignificant regions. Using these definitions, the sampling operation that occurs before the attention on the columns is:

$$x_{i,j} = \sum_{k=1}^{w} (\theta_h)_k \cdot X_{H,C}^{(i,j+\Delta h_k)} \tag{1}$$

where $x_{i,j}$ is the value of the column with indices i, j belonging to the axes as $i \in [0, H]$ and $j \in [0, C]$. Parameter w refers to the horizontal iterations limit (i.e. how many pixels are iterated over), belonging to the previously defined parameter $k_w$. $(\theta_h)$w is the corresponding modulation weight for the associated shift, and $\Delta h_k$ covers how far to sample from the axis center (i.e. the starting column).

After the sampling operation, $W_d$ vectors of size $H_d \times C$ are obtained. The query, key, and values (q, k, v) are then obtained through multi-layer perceptron layers, where the multi-headed self-attention (MSA) is then calculated as: SA(q, k, v)=Softmax( )v $$SA(q, k, v) = Softmax\left(\frac{qk^T}{\sqrt{d_k}}\right)v \tag{2}$$

$$MSA = [SA_1; SA_2; \ldots ; SA_s]$$

for s heads obtained from the input, following the formulation in vision transformers. An image is worth 16×16 words: Transformers for image recognition at scale. *ICLR,* 2021, incorporated herein by reference in its entirety. It is noted that sampling is first by columns (i.e. produce $W_d$ vectors of size $H_d \times C$) and apply MSA, then sample by rows (i.e. produce $H_d$ vectors of size $W_d \times C$) and apply the second MSA. The formulation for the MSA applied to the rows is similar to that of the columns, with the following row sampling:

$$x_{i,j} = \sum_{k=1}^{h} (\theta_w)_k \cdot X_{W,C}^{(i+\Delta w_k,j)} \tag{3}$$

Unlike convolution-based transformers or other types of attention modules, the nature of the adaptive-directional attention allows to alleviate the need for convolutional channel mixing or expansions. The adaptive sampling reduces the model complexity significantly by incorporating a convolution-like operation before applying attention.

Output of the adaptive-directional attention block 612 is then passed into a two-branches (RA 622 and RD 624) decoding space that produces prediction maps.

3. Loss Function

Model learning in both semantic segmentation and object detection can prove difficult due to the large ratio of background to foreground pixels. This disparity was historically studied in multiple works that addressed the issue either through employing multi-stage detectors in object detection, or targeting the way models learn through innovative loss functions that handle class imbalance in semantic segmentation. See Tsung-Yi Lin, Piotr Dollár, Ross Girshick, Kaiming He, Bharath Hariharan, and Serge Belongie. Feature pyramid networks for object detection. In *Proceedings of the IEEE conference on computer vision and pattern recognition*, pages 2117-2125, 2017; Abhinav Shrivastava, Abhinav Gupta, and Ross Girshick. Training region-based object detectors with online hard example mining. In *Proceedings of the IEEE conference on computer vision and pattern recognition*, pages 761-769, 2016; Tsung-Yi Lin, Priya Goyal, Ross Girshick, Kaiming He, and Piotr Dollár. Focal loss for dense object detection. *IEEE Transactions on Pattern Analysis and Machine Intelligence,* 42 (2): 318-327, 2020; and Michael Yeung, Evis Sala, Carola-Bibiane Schönlieb, and Leonardo Rundo. Unified focal loss: Generalising dice and cross entropy-based losses to handle class imbalanced medical image segmentation. *Computerized Medical Imaging and Graphics,* 95:102026, 2022, each incorporated herein by reference in their entirety.

Radar-based datasets have a larger proportion of background pixels when compared to actual objects (foreground). This discrepancy is notably present in the datasets that are operated on, where the background class consists of more than 99% of the total dataset pixels. In addition to the class imbalance between background and foreground pixels, the annotated objects are relatively small in pixel size. Lastly, RD, RA, and AD maps' noisy nature is a learning hurdle for the models. To tackle these issues, an Object Centric-Focal loss (OC) and a Class-Agnostic Object Localization Loss (CL) are considered. Both of them are added in a single term, the Class-Agnostic Object Loss (CA), and include a multi-view range matching loss (MV) that suits the multi-output architecture.

3.1 Class-Agnostic Object Loss

Object Centric-Focal Loss: The main highlight of Object Centric-Focal loss is the weighing of the binary cross-entropy between the background and foreground of the predictions, with higher weight being given to the foreground. This is defined as:

$$\mathcal{L}_{OC} = (1 - y_{pred})\left(\delta\mathcal{L}_{BCE_{FG}} + (1 - \delta)\mathcal{L}_{BCE_{BG}}\right) \tag{4}$$

where δ is a weighing factor (set to 0.6) and $\mathcal{L}_{BCE}$ is the binary cross entropy, calculated with the two classes 'background' and 'foreground'. While the semantic segmentation objective includes multi-class labels, the aim is to use Object Centric-Focal loss to penalize the model on hard background prediction, keeping it only to a binary background/foreground calculation. While other loss functions propose a power factor on the $(1-y_{pred})$ term, it is removed and one-hot prediction masks are used. See Lin et al. (2020). Both operations come in favor of having a balanced approach between ground truth probabilities and loss value, and heavily penalizing misclassification between the background and foreground.

Figure 7A:
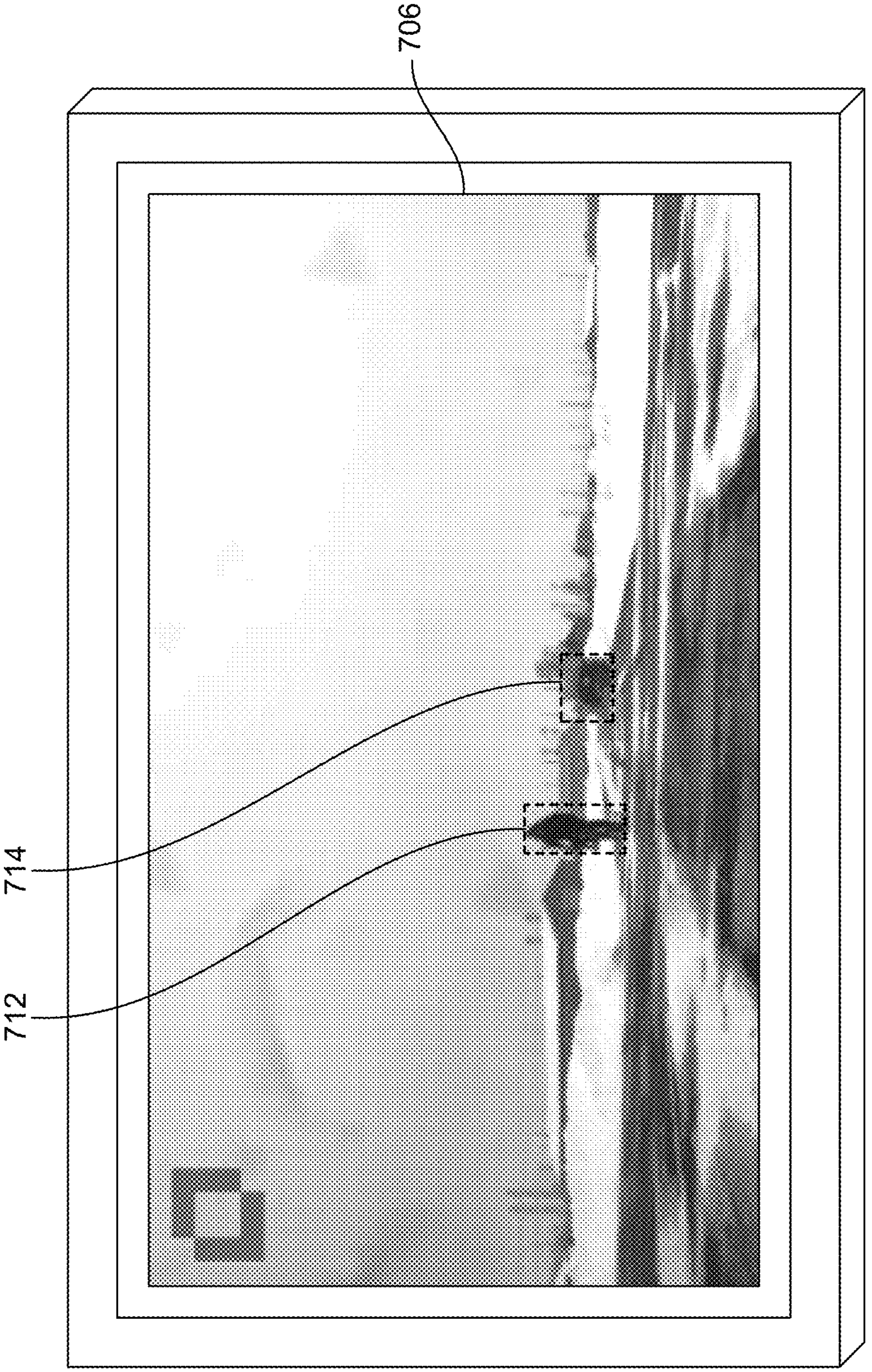
FIGS. 7A-7D illustrate Radar RA, RD, and AD maps with synchronized RGB image in FIG. 7A.
Figure 7D:
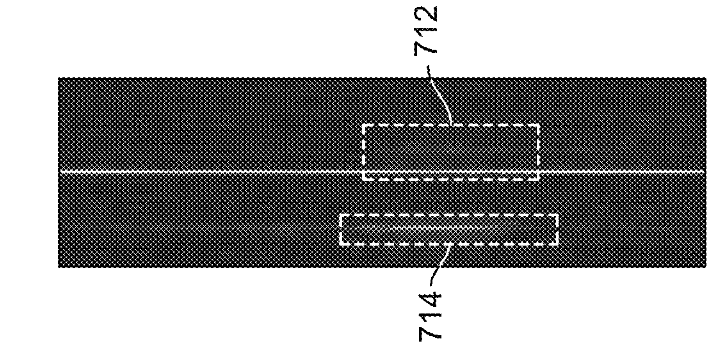
Figure 7C:
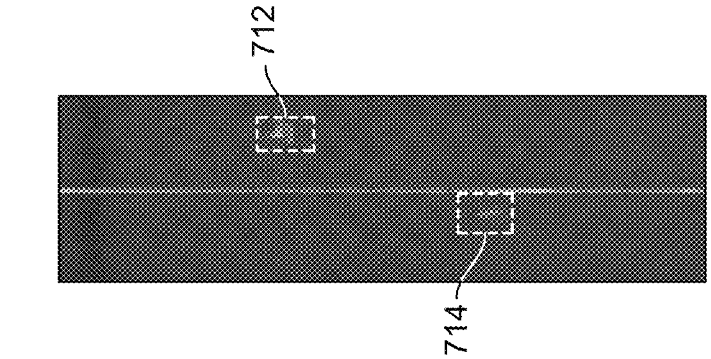
Figure 7B:
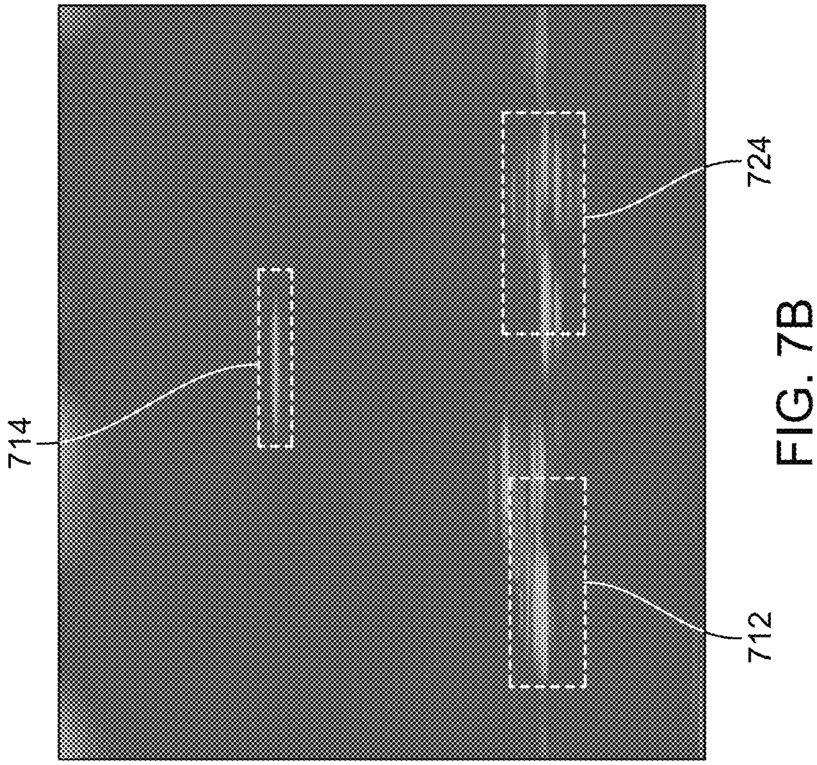
Figure 7E:
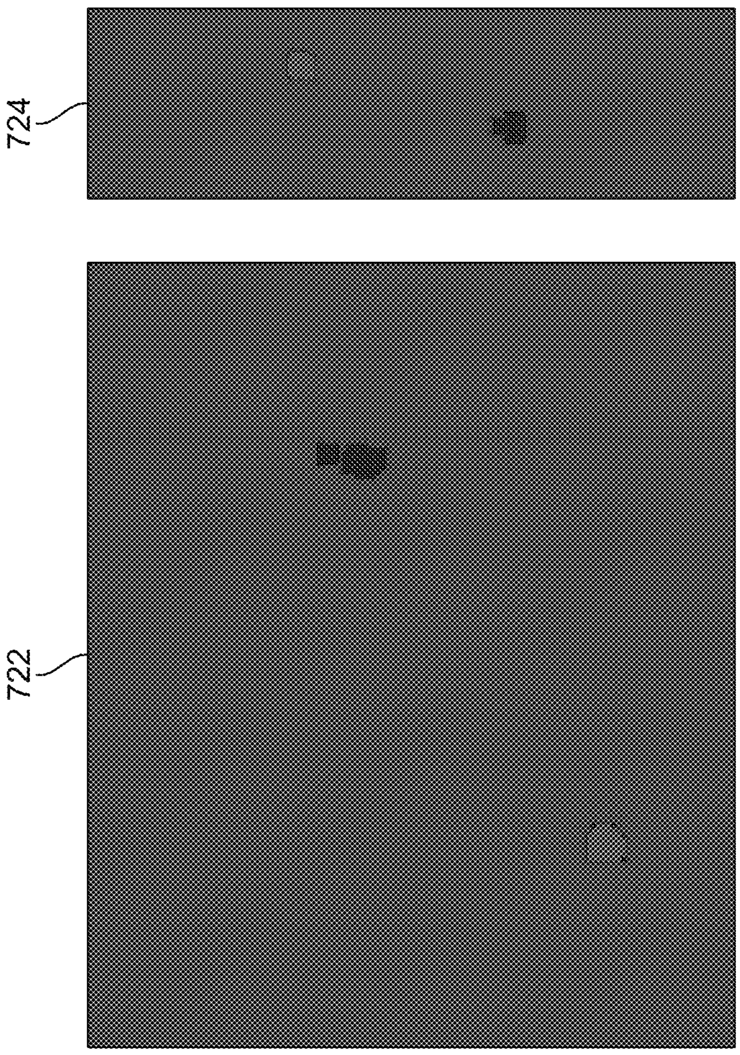
FIG. 7E illustrates the ground truth mask for the RA and RD maps.
Figure 7F:
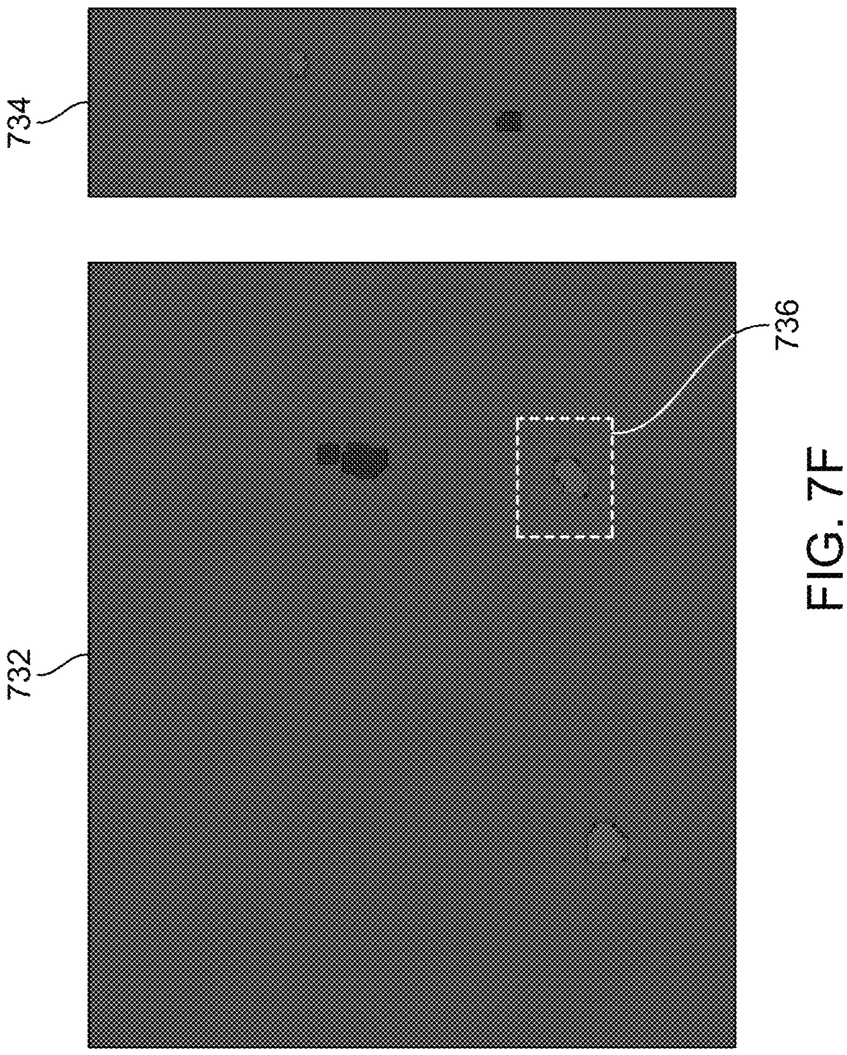
FIG. 7F illustrates a false segmentation with noise seen as an object.

Class-Agnostic Object Localization Loss: To illustrate the rationale of using the localization loss, RA and RD input maps are shown with their output predictions, along with the corresponding RGB image in FIG. 7A. In particular, FIG. 7B shows Radar RA map, FIG. 7C shows RD map, and FIG. 7D shows AD map, with synchronized RGB image shown in FIG. 7A. Annotation boxes 712, 714 correspond to the person and car, respectively, shown in the RGB image of FIG. 7A. A sample random noise appearing on the RA map of FIG. 7B is highlighted with a 714 box. FIG. 7E shows the ground truth mask for the RA and RD maps (722, 724) of the scene. FIG. 7F shows a false segmentation with the noise seen as an object 736. The noise shown in the RA map 732 does not appear as frequently in RD map 734.

Any other object signature seen in the RA input image can be attributed to speckle noise, Doppler-induced noise, or any other sort of undesired noise that is unaccounted for. Due to this noisy nature of radar data, producing a significantly larger amount of false positives was a noticeable pattern across tested models. It is also noticed that there is similar behavior in the opposite way, where the model learns the noise as part of the background and confuses objects with similar signatures as the noise for being part of the background, resulting in many false negatives. Therefore, an intersection-based loss is used that penalizes the model on false background/foreground predictions. This builds on the previous object-centric loss by creating an IoU-based loss that penalizes mislocalization of objects, defined as:

$$\mathcal{L}_{CL} = 1 - \frac{TP}{TP + FN + FP}, \tag{5}$$

where TP refers to true positives, FN to false negatives, and FP to false positives. Similar to $\mathcal{L}_{OC}$, an implementation is extended to focus on the one-hot predictions instead of the probability maps, which imposes a larger penalty for making a false background prediction. Adding $\mathcal{L}_{OC}$ and $\mathcal{L}_{CL}$ terms yields a class-agnostic object loss 642: $\mathcal{L}_{CA}=\mathcal{L}_{OC}+\mathcal{L}_{CL}$.

3.2 Multi-Class Segmentation Loss

To include the multi-class nature of the dataset and localization of different class predictions, a Soft Dice loss (SD) term 644 is used that is similar to the one used in Ouaknine et al., described as:

$$\mathcal{L}_{SD} = \frac{1}{K}\sum_{k=1}^{K}\left[1 - \frac{2\sum yp}{\sum y^2 + p^2}\right] \tag{6}$$

where y and p refer to the ground truth and probability map output of the model. Unlike the previous terms, a one-hot binary map prediction is not used and instead the original continuous probability map is used. The $\mathcal{L}_{SD}$ 644 is not limited to background/foreground classes since it is used for multi-class predictions.

3.3 Range Consistency Loss

In addition to the class-agnostic object loss and multi-class segmentation loss, a Multi-View range matching loss (MV) 646 is defined as:

$$\mathcal{L}_{MV} = \begin{cases} \frac{1}{2}(RD_m - RA_m)^2 & |RD_m - RA_m| < 1 \\ |RD_m - RA_m| - \frac{1}{2} & \text{otherwise} \end{cases} \tag{7}$$

where $RD_m$ and $RA_m$ are the max-pooled RA and RD probability maps, leaving only the R direction. The analytical term of this loss is a special case of the Huber loss and was proven to be more robust than mean-square error when dealing with outliers. See Peter J. Huber. Robust Estimation of a Location Parameter. *The Annals of Mathematical Statistics*, 35(1):73-101, 19646, incorporated herein by reference in its entirety.

Overall Loss: The total loss is then defined as the weighted sum of all three losses with weights $\alpha_1$, $\alpha_2$, and $\alpha_3$ as:

$$\mathcal{L}_{total} = \alpha_1\mathcal{L}_{CA} + \alpha_2\mathcal{L}_{SD} + \alpha_3\mathcal{L}_{MV} \tag{8}$$

EXAMPLES

1. Datasets

To test the effectiveness of the disclosed approach, the CARRADA dataset is used as the main multi-class radar semantic segmentation dataset. The disclosed method is also tested on RADIal dataset and compared to previous state-of-the-art methods in radar semantic segmentation and object detection.

CARRADA: The CARRADA dataset consists of synchronized camera-radar recordings of various driving scenarios containing 12,666 frames. The annotations of the data were done semi-automatically and provided for the RD and RA views. The dataset contains four object categories: pedestrian, cyclist, car, and background. The input are the RA, RD, and AD maps decomposed from the 3D RAD tensor. RA maps have a size of 1×256×256 while RD and AD have a different resolution of 1×256×64. The 2D decomposition of the RAD tensor is used to reduce the model complexity, which is an important factor in radar perception in automotive driving.

RADIal: The RADIal dataset is a new high-resolution dataset consisting of 8,252 labeled frames. See Rebut et al. RADIal varies from CARRADA in that it does not provide a multi-view input and depends only on RD input. The outputs are also produced and compared to projected annotated RGB images, unlike the CARRADA dataset that compares annotation directly in the RD/RA planes. RADIal also provides a high-definition input, where the input size is 32×512×256. RADIal provides annotations for two classes only: free-driving-space and vehicle annotations (i.e., free or occupied).

2. Evaluation Metrics

The same evaluation metrics as used in previous works is followed, which are the common intersection over union (IoU), the Dice score (F1 score), and the mean of each across the classes. The mIoU is also used to evaluate the semantic segmentation task on the RADIal dataset. The combination of the mIoU and the Dice score creates a fair and comprehensive assessment of the results. For the object detection task in RADIal, the same metrics as Rebut et al. is used with Average Precision (AP), Average Recall (AR), and regression errors.

3. Implementation Details

TransRadar is implemented and trained using the PyTorch library on a single NVIDIA A100 GPU. In one embodiment, the training of TransRadar is performed on a computer workstation that is configured with a central processing unit (CPU), the NVIDIA GPU, RAM and a hard drive, as well as other peripheral components. In one embodiment, the training of TransRadar is performed in a cloud service that is equipped with GPU support. For purposes of this disclosure, the computing hardware, including CPU, GPU, and memory is referred to as processing circuitry.

The software program for TransRadar is stored in a repository, such as GitHum, and can be downloaded to or distributed via a computer readable storage medium, including but not limited to Flash memory, solid-state memory, magnetic hard disc, optical disc, to name a few.

All reported models on the CARRADA dataset were trained with a batch size of 6 and using 5 past frames. The Adam optimizer is used with initial learning rate of $1\times10^{-4}$, and an exponential scheduler (step=10). See Diederik P. Kingma and Jimmy Ba. Adam: A method for stochastic optimization. In Yoshua Bengio and Yann LeCun, editors, *3rd International Conference on Learning Representations, ICLR* 2015, *San Diego, CA, USA, May* 7-9, 2015, *Conference Track Proceedings,* 2015, incorporated herein by reference in its entirety. The final TransRadar model uses 8× cascaded blocks of the adaptive-directional attention block. For the testing, a batch size of 1 is used and a similar number of past frames.

For the RADIal dataset training, FFTRad-Net backbone is replaced with the disclosed model. See Rebut et al. A single-view encoding/decoding paradigm is employed similar to the one shown in FIG. 6. the same segmentation and detection heads are used from the FFTRadNet model, and the same optimizer and scheduling is used as CARRADA dataset training.

4. State-of-the-Art Comparisons

Semantic Segmentation on the CARRADA: Table 1 shows the quantitative comparisons of the proposed approach with existing state-of-the-art frameworks for radar semantic segmentation. The results listed in the table show that TransRadar outperforms state-of-the-art methods in both the mIoU and mDice metrics. A large part of this is attributed to the introduction of the CA loss, which will be discussed in detail in the ablation studies in Section 5.5. The model achieves new state-of-the-art performance with an RD mIoU score of 63.9%, which outperforms the closest baseline by 3.2%, and has a mDice score of 75.6%. For the RA map predictions, the method yields a mIoU of 47.5%, outperforming the state-of-the-art score by 4.0%, with a mDice of 59.3%. It is also pointed out that the model significantly outperforms other models in the Cyclist class, where there is a large gap of 12.0% between the model and the second-best model in the RA map, and 13.1% in the RD map. This can be attributed to the consistency with RD as well as the ability to predict harder examples. Across the board, the model sets new state-of-the-art scores except for the car class IoU and Dice in the RA maps, where TRODNet has a slightly higher score.

TABLE 1

Semantic segmentation performance on the test split of the CARRADA dataset, shown for the RD (Range-Doppler) and RA (Range-Angle) views. Columns from left to right are the view (RD/RA), the name of the model, the number of parameters in millions, the intersection-over-union (IoU) score of the four different classes with their mean, and the Dice score for the same classes.

| | | Params | IoU (%) | | | | | Dice (%) | | | | |
|---|---|---|---|---|---|---|---|---|---|---|---|---|
| View | Method | (M) | Bkg. | Ped. | Cycl. | Car | mIoU | Bkg. | Ped. | Cycl. | Car | mDice |
| RD | FCN-8s | 134.3 | 99.7 | 47.7 | 18.7 | 52.9 | 54.7 | 99.8 | 24.8 | 16.5 | 26.9 | 66.3 |
| | U-Net | 17.3 | 99.7 | 51.1 | 33.4 | 37.7 | 55.4 | 99.8 | 67.5 | 50.0 | 54.7 | 68.0 |
| | DeepLabv3+ | 59.3 | 99.7 | 43.2 | 11.2 | 49.2 | 50.8 | 99.9 | 60.3 | 20.2 | 66.0 | 61.6 |
| | RSS-Net | 10.1 | 99.3 | 0.1 | 4.1 | 25.0 | 32.1 | 99.7 | 0.2 | 7.9 | 40.0 | 36.9 |
| | RAMP-CNN | 106.4 | 99.7 | 48.8 | 23.2 | 54.7 | 56.6 | 99.9 | 65.6 | 37.7 | 70.8 | 68.5 |
| | MVNet | 2.4 | 98.0 | 0.0 | 3.8 | 14.1 | 29.0 | 99.0 | 0.0 | 7.3 | 24.8 | 32.8 |
| | TMVA-Net | 5.6 | 99.7 | 52.6 | 29.0 | 53.4 | 58.7 | 99.8 | 68.9 | 45.0 | 69.6 | 70.9 |
| | PeakConv | 6.3 | — | — | — | — | 60.7 | — | — | | — | 72.5 |
| | TransRadar | 4.8 | 99.9 | 57.7 | 36.1 | 61.9 | 63.9 | 99.9 | 73.2 | 53.1 | 76.5 | 75.6 |
| RA | FCN-8s | 134.3 | 99.8 | 14.8 | 0.0 | 23.3 | 34.5 | 99.9 | 25.8 | 0.0 | 37.8 | 40.9 |
| | U-Net | 17.3 | 99.8 | 22.4 | 8.8 | 0.0 | 32.8 | 99.9 | 25.8 | 0.0 | 37.8 | 40.9 |
| | DeepLabv3+ | 59.3 | 99.9 | 3.4 | 5.9 | 21.8 | 32.7 | 99.9 | 6.5 | 11.1 | 35.7 | 38.3 |
| | RSS-Net | 10.1 | 99.5 | 7.3 | 5.6 | 15.8 | 32.1 | 99.8 | 13.7 | 10.5 | 27.4 | 37.8 |
| | RAMP-CNN | 106.4 | 99.8 | 1.7 | 2.6 | 7.2 | 27.9 | 99.9 | 3.4 | 5.1 | 13.5 | 30.5 |
| | MVNet | 2.4 | 98.8 | 0.1 | 1.1 | 6.2 | 26.8 | 99.0 | 0.0 | 7.3 | 24.8 | 28.5 |

TABLE 1-continued

Semantic segmentation performance on the test split of the CARRADA dataset, shown for the RD (Range-Doppler) and RA (Range-Angle) views. Columns from left to right are the view (RD/RA), the name of the model, the number of parameters in millions, the intersection-over-union (IoU) score of the four different classes with their mean, and the Dice score for the same classes.

| | | Params | IoU (%) | | | | | Dice (%) | | | | |
|---|---|---|---|---|---|---|---|---|---|---|---|---|
| View | Method | (M) | Bkg. | Ped. | Cycl. | Car | mIoU | Bkg. | Ped. | Cycl. | Car | mDice |
| | TMVA-Net | 5.6 | 99.8 | 26.0 | 8.6 | 30.7 | 41.3 | 99.9 | 41.3 | 15.9 | 47.0 | 51.0 |
| | T-RODNet | 162.0 | 99.9 | 25.4 | 9.5 | 39.4 | 43.5 | 99.9 | 40.5 | 17.4 | 56.6 | 53.6 |
| | PeakConv | 6.3 | — | — | — | — | 42.9 | — | — | | — | 53.3 |
| | TransRadar | 4.8 | 99.9 | 30.3 | 21.5 | 38.2 | 47.5 | 99.9 | 46.6 | 35.3 | 55.3 | 59.3 |

See Jonathan Long, Evan Shelhamer, and Trevor Darrell. Fully convolutional networks for semantic segmentation. In *Proceedings of the IEEE conference on computer vision and pattern recognition*, pages 3431-3440, 2015; Prannay Kaul, Daniele de Martini, Matthew Gadd, and Paul Newman. Rss-net: Weakly-supervised multi-class semantic segmentation with fmcw radar. In 2020 *IEEE Intelligent Vehicles Symposium* (*IV*), pages 431-436, 2020; Gao (2021), each incorporated herein by reference in their entirety.

Figure 8A:
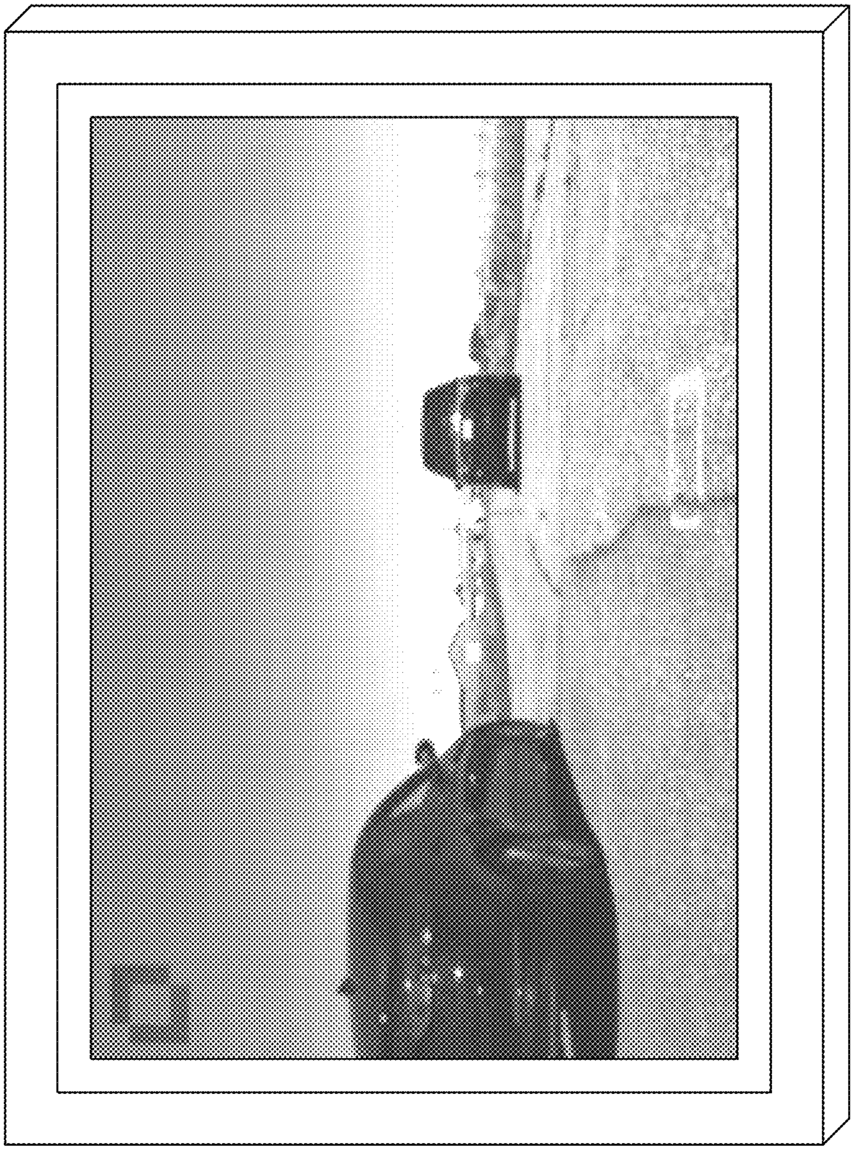
FIGS. 8A-8G and FIGS. 9A-9G illustrate qualitative results on two test scenes from the CARRADA test split showing the RGB camera view with results of semantic segmentation from different methods.
Figure 8B:
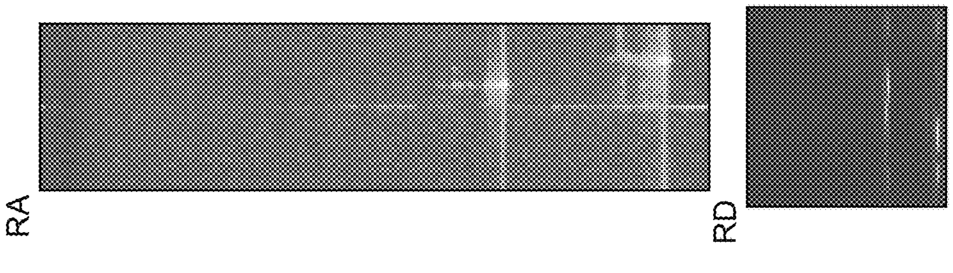
Figure 8C:
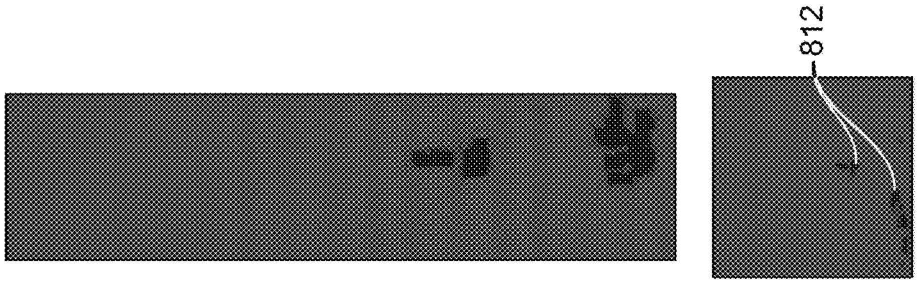
Figure 8D:
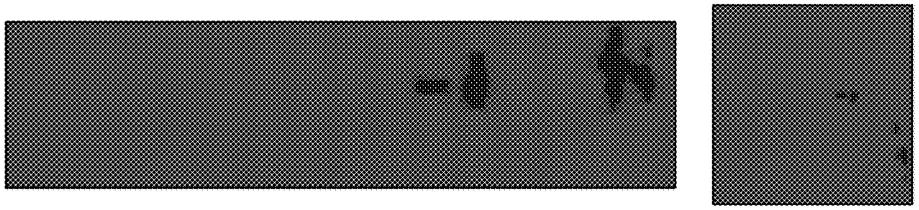
Figure 8E:
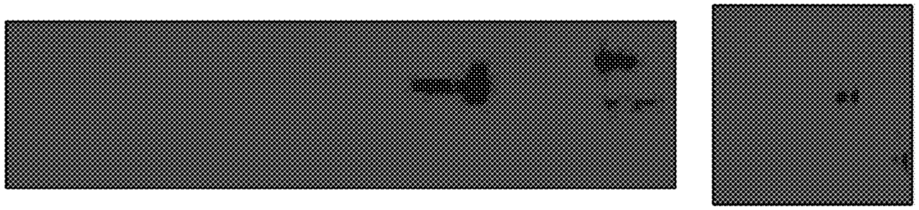
Figure 8F:
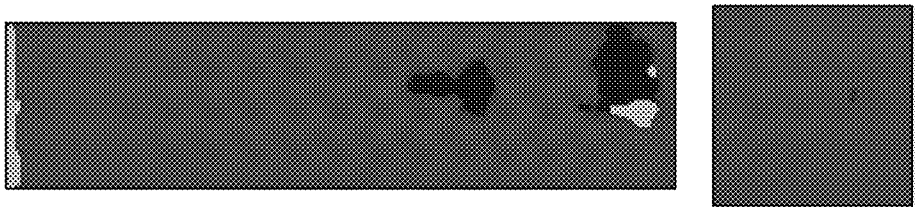
Figure 8G:
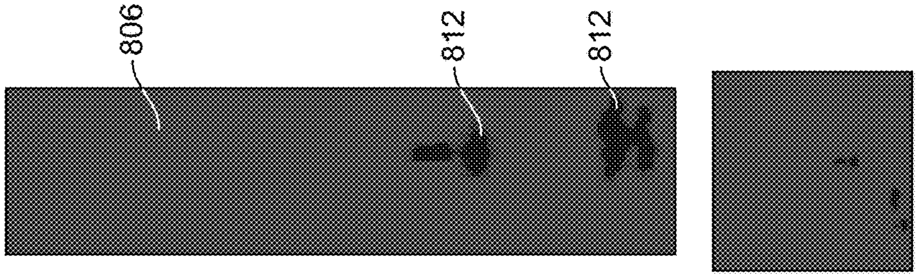
Figure 9A:
Figure 9G:
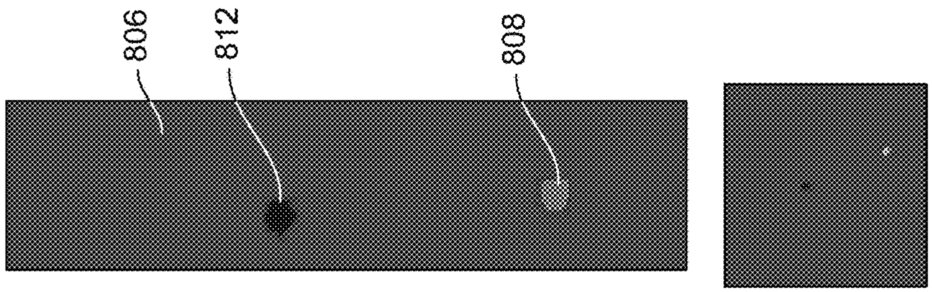
Figure 9F:
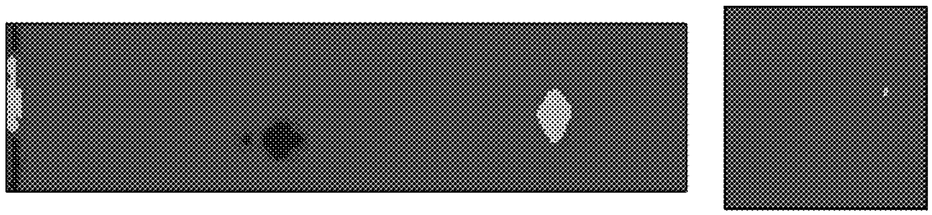
Figure 9E:
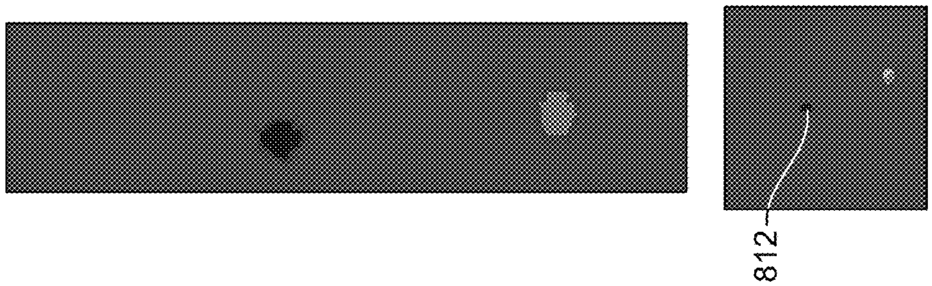
Figure 9D:
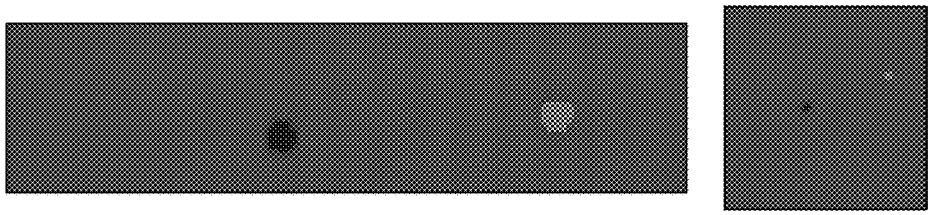
Figure 9C:
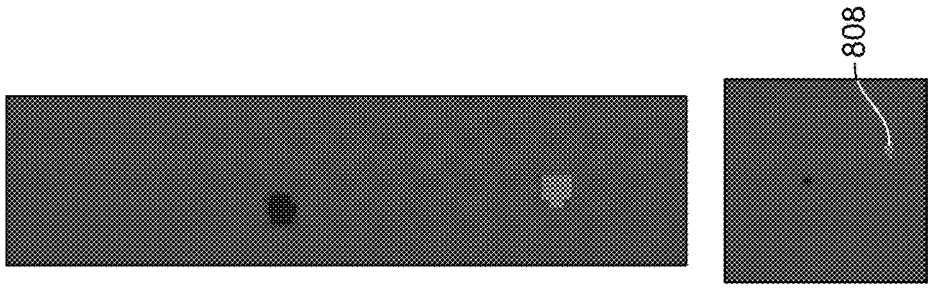
Figure 9B:
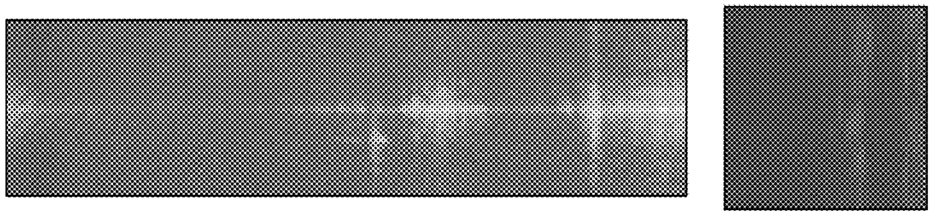

FIGS. 8A-8G and FIGS. 9A-9G illustrate qualitative results on two test scenes from the CARRADA test split showing the RGB camera view (FIG. 8A, FIG. 9A) with results of semantic segmentation from different methods. For every image, (top row) depicts the RD and (bottom row) depicts RA. For scene in FIG. 8A, FIG. 8B illustrates RD/RA inputs, FIG. 8C illustrates ground-truth, FIG. 8D illustrates TransRadar, FIG. 8E illustrates TMVA-Net, FIG. 8F illustrates MVNet, and FIG. 8G illustrates UNet. For scene in FIG. 9A, FIG. 9B illustrates RD/RA inputs, FIG. 9C illustrates ground-truth, FIG. 9D illustrates TransRadar, FIG. 9E illustrates TMVA-Net, FIG. 9F illustrates MVNet, and FIG. 9G illustrates UNet. All RD outputs were rotated for visual coherency. Different classes include. 812: Car, 808: Pedestrian. 806: background.

FIGS. 8A-8G shows two qualitative results on a hard scene and FIGS. 9A-9G shows a normal scene from the test split of CARRADA. The first scene FIG. 8A shows a good segmentation with instances of mislocalization in all tested methods, with TransRadar and UNet giving the best prediction results. Well-segmented RD and RA predictions are presented in the second scene relative to the mask from the method when compared to other models. There is also a coherent translation of the RD to RA views in the range dimension in both scenes.

Semantic Segmentation on RADIal: The semantic segmentation results of the RADIal dataset are shown in Table 2. The method outperforms all previously reported models in the semantic segmentation task with a mIoU of 81.1% and less than half the model size of the most recently reported state-of-the-art method, C-M DNN. See Yi Jin, Anastasios Deligiannis, Juan-Carlos Fuentes-Michel, and Martin Vossiek. Cross-modal supervision-based multitask learning with automotive radar raw data. *IEEE Transactions on Intelligent Vehicles*, pages 1-15, 2023, incorporated herein by reference in its entirety. These results showcase the ability of the disclosed method, which is tailored to radar data, to tackle various datasets. Object detection on RADIal: Object detection results on the RADIal dataset are shown in Table 3. The method outperforms all previously reported models in this task as well with significantly higher AR and lower angular prediction error. Despite our method not being designed for the task of object detection, the model still sets a new record for this task. All taken into account, the model sets a new standard for state-of-the-art predictions in these two datasets.

TABLE 2

Semantic segmentation results on the RADIal dataset Our method outperforms most recent state-of-the-art methods in both metrics. The best scores per column are in bold. '—' is an unreported value with no replicable results.

| Backbone | # Params. (m) | % mIoU |
|---|---|---|
| PolarNet | — | 60.6 |
| FFTRadNet | 3.8 | 74.0 |
| C-M DNN | 7.7 | 80.4 |
| **TransRadar** | **3.4** | **81.1** |

See Farzan Erlik Nowruzi, Dhanvin Kolhatkar, Prince Kapoor, Elnaz Jahani Heravi, Fahed Al Hassanat, Robert Laganière, Julien Rebut, and Waqas Malik. Polarnet: Accelerated deep open space segmentation using automotive radar in polar domain. *CoRR*, abs/2103.03387, 2021, each incorporated herein by reference in their entirety.

TABLE 3

Object detection results on the RADIal dataset. Our method yields an increase in the average recall and a significant decrease in the angle regression error. The best scores per column are in bold. '—' is an unreported value with no replicable results.

| Backbone | % AP ↑ | % AR ↑ | R(m) ↓ | A(°)↓ |
|---|---|---|---|---|
| Pixor | 96.6 | 81.7 | 0.10 | 0.20 |
| FFTRadNet | 96.8 | 82.2 | **0.11** | 0.17 |
| C-M DNN | 96.9 | 83.5 | — | — |
| **TransRadar** | **97.3** | **98.4** | **0.11** | **0.10** |

See Bin Yang, Wenjie Luo, and Raquel Urtasun. Pixor: Realtime 3d object detection from point clouds. In *Proceedings of the IEEE conference on Computer Vision and Pattern Recognition*, pages 7652-7660, 2018, each incorporated herein by reference in their entirety.

5. Discussion & Ablation Study

Different Backbone Architectures: To evaluate the effect of using the loss function for TransRadar, different other backbones are compared using the same configuration on the CARRADA dataset. Tested backbones include available state-of-the-art methods and other transformer architectures such as VIT, UNETR, ConViT, and CSWin Transformer. See Ali Hatamizadeh, Yucheng Tang, Vishwesh Nath, Dong Yang, Andriy Myronenko, Bennett Landman, Holger R Roth, and Daguang Xu. Unetr: Transformers for 3d medical image segmentation. In *Proceedings of the IEEE/CVF winter conference on applications of computer vision*, pages 574-584, 2022; Haiping Wu, Bin Xiao, Noel Codella, Mengchen Liu, Xiyang Dai, Lu Yuan, and Lei Zhang. Cvt: Introducing convolutions to vision transformers. In *Proceedings of the IEEE/CVF International Conference on Computer Vision*, pages 22-31, 2021; and Xiaoyi Dong, Jianmin Bao, Dongdong Chen, Weiming Zhang, Nenghai Yu, Lu Yuan, Dong Chen, and Baining Guo. Cswin transformer: A general vision transformer backbone with cross-shaped windows. In *Proceedings of the IEEE/CVF Conference on Computer Vision and Pattern Recognition*, pages 12124-12134, 2022, each incorporated herein by reference in their entirety. This allows evaluation of both the loss function with other state-of-the-art models and the adaptive-directional attention with other attention-based techniques. Table 4 lists the quantitative comparison between them. Other than TMVA-Net, models were implemented with the same encoding and decoding as the adaptive-directional attention block. It is noticed that the loss improves TMVA-Net's performance significantly in both RD and RA mIoU scores. TransRadar still outperforms all other attention models and shows that the sparse nature of the adaptive-directional attention yields the best results in radar perception. To evaluate the effect of the adaptive sampling, the model is implemented by applying attention to unshifted and unmodulated axes. Adding adaptive-directional sampling yields an increase of 1.40% in the RD mIoU and a 4.04% increase in the RA mIoU, while using less parameters than previous state-of-the-art methods.

TABLE 4

Different backbones using our proposed loss configuration. The best scores are in bold. 'No Adaptive' refers to the implementation of our method where no offset or modulating to the axis sampling is introduced (i.e. straight-line rows and columns).

| Architecture | Param. (M) | $mIoU_{RD}$(%) | $mIoU_{RA}$(%) |
|---|---|---|---|
| UNETR | 165.0 | 52.5 | 34.2 |
| CSWin | 83.0 | 25.0 | 21.9 |
| ViT | 238.9 | 28.5 | 36.9 |
| UNet | 184.4 | 53.1 | 38.4 |
| TMVA-Net | 5.6 | 60.7 | 43.1 |
| No Adaptive | **4.0** | 61.9 | 42.3 |
| **TransRadar** | 4.8 | **63.9** | **47.5** |

See 10, 5, 6, 29, each incorporated herein by reference in their entirety.

Ablation for the adaptive-directional attention: Ablation experiments are also performed on the adaptive-directional attention head. The semantic segmentation performance on the test split of the CARRADA dataset is shown in Table 5. Noticeably, attention contributes to the increments in RD map performance, while the directional sampling contributes to RA's mIoU.

TABLE 5

Ablation experiment for the adaptive-directional attention head. We report segmentation performance on CARRADA dataset in terms of mIoU for the RA and RD maps.

| Model | $mIoU_{RD}$ | $mIoU_{RA}$ |
|---|---|---|
| Sampling only | 62.9 | 47.4 |
| Attention without sampling | 63.0 | 43.3 |
| Attention with normal sampling | 64.1 | 45.7 |
| TransRadar | 63.9 | 47.5 |

Evaluation of Loss Functions: The effect of the loss functions is further tested on the learning method, where the model is tested under different combinations of the functions. Removing $\mathcal{L}_{SD}$ yields poor prediction scores, which showcases its necessity in this task. Using their model without RA-RD coherence yields a poor RA score, while using a coherence loss boosts RA's score by at least 3.5%. The effects of $\mathcal{L}_{OC}$ and $\mathcal{L}_{CL}$, are reported separately, or both combined ($\mathcal{L}_{CA}$). Removing $\mathcal{L}_{OC}$ from the $\mathcal{L}_{CA}$ term reduces RD score heavily while removing $\mathcal{L}_{CL}$ from $\mathcal{L}_{CA}$ reduces RA score. Localization is a harder task in RA maps than it is in RD due to its larger resolution which results in a more pronounced effect from $\mathcal{L}_{CL}$. Lastly, the effect of introducing the $\mathcal{L}_{MV}$ loss instead of the baseline coherence loss is compared. Following the discussion in Section 4.4, $\mathcal{L}_{MV}$ remedies the problem of RA reducing RD's accuracy, where it is noticed that there is an increase in the accuracy of RA without compromising RD scores.

TABLE 6

Comparison of performance of loss functions. $\mathcal{L}_{OC}$ is the object centric-focal loss, $\mathcal{L}_{CL}$ is the class-agnostic object localization loss, $\mathcal{L}_{CA}$ is the sum of previous terms, $\mathcal{L}_{SD}$ is the soft Dice loss, $\mathcal{L}_{MV}$ is the multi-view range matching loss, and CoL is the coherence loss used in Ouaknine. The best scores are in bold.

| Loss | | | | | RD | RA |
|---|---|---|---|---|---|---|
| $\mathcal{L}_{OC}$ | $\mathcal{L}_{CL}$ | $\mathcal{L}_{SD}$ | $\mathcal{L}_{CoL}$ | $\mathcal{L}_{MV}$ | mIoU | mIoU |
| ✓ | ✓ | | | ✓ | 3.7 | 7.5 |
| ✓ | ✓ | ✓ | | | 61.9 | 37.5 |
| | ✓ | ✓ | | ✓ | 61.2 | 45.9 |
| ✓ | | ✓ | | ✓ | 62.3 | 42.2 |
| ✓ | ✓ | ✓ | ✓ | | 62.9 | 47.4 |
| ✓ | ✓ | ✓ | | ✓ | **63.9** | **47.5** |

Figure 10:
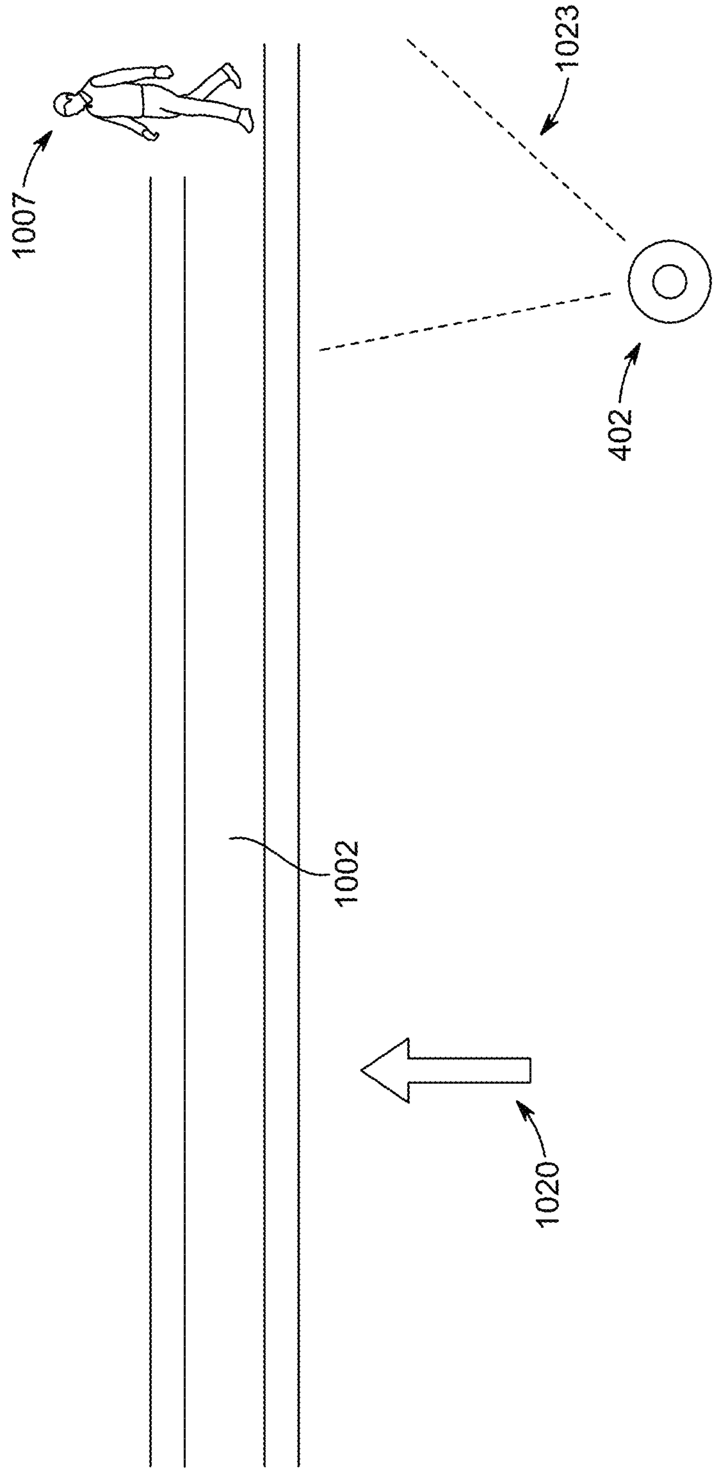
FIG. 10 is a non-limiting exemplary use case of the radar semantic segmentation method to detect a pedestrian from a vehicle equipped with a radar.

FIG. 10 is a non-limiting exemplary use case of the radar semantic segmentation method to detect a pedestrian from a vehicle equipped with a radar. A vehicle facing direction 1020 may encounter a situation where a pedestrian 1007 is entering a crosswalk 1002. A radar 402 may be included as a sensor for a vehicle advanced driver assistance safety system. The radar 402 sends radar signals over a range 1023 to monitor objects and object movement. Radar signals can be analyzed on a periodic basis by the vehicle controller 402. The semantic segmentation method performed in the vehicle controller 402 may output an indication that a pedestrian is detected, as well as an indication of the direction of movement of the pedestrian. In the case that a pedestrian is detected, program logic performed in the vehicle controller 402 may instruct an appropriate action, such as engaging the brakes of the vehicle, issuing a warning message, or even projecting a message to the pedestrian that it is safe to cross, to name a few.

Figure 11:
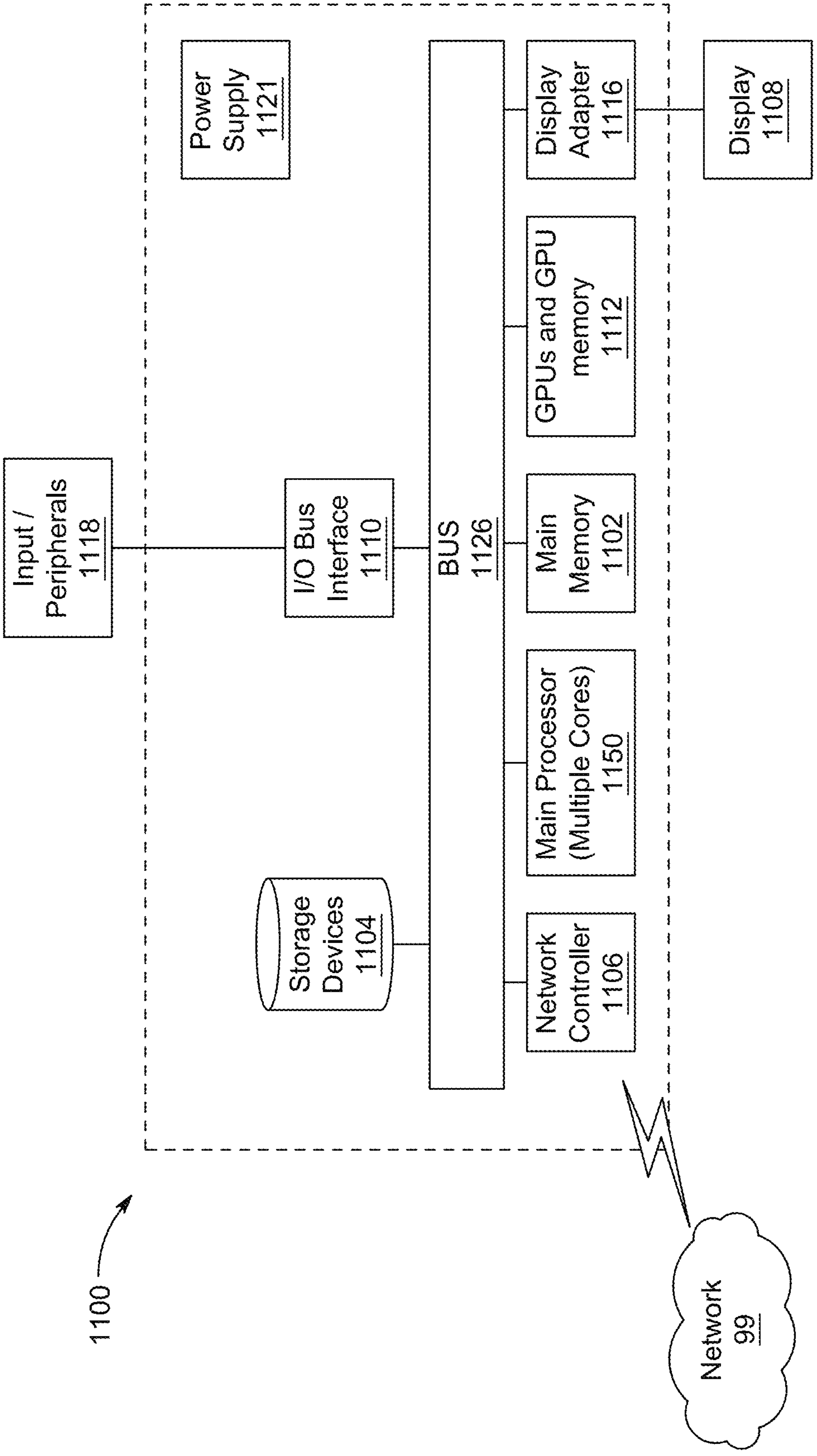
FIG. 11 is a block diagram of a non-limiting computer workstation as a hardware platform for training and inferencing the radar semantic segmentation of FIG. 6.

FIG. 11 is a block diagram of a non-limiting computer workstation as a hardware platform for training and inferencing the radar semantic segmentation of FIG. 6, according to an exemplary aspect of the disclosure. The computer system may be an AI workstation running an operating system, for example Ubuntu Linux OS, Windows, a version of Unix OS, or Mac OS. The computer system 1100 may include one or more central processing units (CPU) 1150 having multiple cores. The computer system 1100 may include a graphics board 1112 having multiple GPUs, each GPU having GPU memory. The graphics board 1112 may perform many of the mathematical operations of the disclosed machine learning methods. The computer system 1100 includes main memory 1102, typically random access memory RAM, which contains the software being executed by the processing cores 1150 and GPUs 1112, as well as a non-volatile storage device 1104 for storing data and the software programs. Several interfaces for interacting with the computer system 1100 may be provided, including an I/O Bus Interface 1110, Input/Peripherals 1118 such as a keyboard, touch pad, mouse, Display Adapter 1116 and one or more Displays 1108, and a Network Controller 1106 to enable wired or wireless communication through a network 99. The interfaces, memory and processors may communicate over the system bus 1126. The computer system 1100 includes a power supply 1121, which may be a redundant power supply.

In some embodiments, the computer system 1100 may include a server CPU and a graphics card by NVIDIA, in which the GPUs have multiple CUDA cores. In some embodiments, the computer system 1100 may include a machine learning engine 1112.

The above-described hardware description is a non-limiting example of corresponding structure for performing the functionality described herein.

The disclosed attention-based architecture and method is for the task of semantic segmentation on radar frequency images. The architecture includes an adaptive-directional attention block and a loss function tailored to the needs of radar perception. The architecture achieves state-of-the-art performance on two semantic segmentation radar frequency datasets, CARRADA and RADIal, using a smaller model size. The architecture also achieves improved performance for the task of object detection in radar images.

The architecture can be implemented in a manner that fuses radar input with RGB images to produce more robust predictions. The ability to fuse both data sources enables a new standard for advanced driver assist safety systems, as well as for automotive driving.

Numerous modifications and variations of the present disclosure are possible in light of the above teachings. It is therefore to be understood that the invention may be practiced otherwise than as specifically described herein.

The invention claimed is:

1. An automotive control system, comprising:

at least one radar sensor, attached to a vehicle body panel of a vehicle, for receiving radar signals;

processing circuitry configured to:

derive multiple frames of radar-domain feature maps from the radar signals, each frame including an Angle-Doppler (AD) feature map, a Range-Doppler (RD) feature map, and a Range-Angle (RA) feature map, wherein the AD feature map, the RD feature map, and the RA feature map of each frame are respective two-dimensional (2D) views of a corresponding three-dimensional (3D) Range-Angle-Doppler (RAD) cube, encode, using an AD neural network encoder, the AD feature maps of the multiple frames of radar-domain feature maps to generate encoded AD feature maps, encode, using an RD neural network encoder, the RD feature maps of the multiple frames of radar-domain feature maps to generate encoded RD feature maps, encode, using an RA neural network encoder, the RA feature maps of the multiple frames of radar-domain feature maps to generate encoded RA feature maps, concatenate, in a channel-wise manner, the encoded AD feature maps, the encoded RD feature maps, and the encoded RA feature maps to obtain a multi-view latent feature map block, using an adaptive-directional attention block, transform the multi-view latent feature map block by sampling columns of the multi-view latent feature map block and applying self-attention to the sampled columns, and sampling rows of the multi-view latent feature map block and applying self-attention to the sampled rows, using an RD decoder, decode the transformed multi-view latent feature map block to generate an RD semantic segmentation mask corresponding to the RD feature maps, the RD semantic segmentation mask including pixel-level class predictions for the RD feature maps, using an RA decoder, decode the transformed multi-view latent feature map block to generate an RA semantic segmentation mask corresponding to the RA feature maps, the RA semantic segmentation mask including pixel-level class predictions for the RA feature maps, and identify objects and determine a distance from the vehicle to each identified object based on the RD semantic segmentation mask and the RA semantic segmentation mask.

2. The automotive control system of claim 1, wherein the adaptive-directional attention block defines a column attention axis and a row attention axis for processing the multi-view latent feature map block.

3. The automotive control system of claim 2, wherein sampling the columns of the multi-view latent feature map block and sampling the rows of the multi-view latent feature map block include sampling along the column attention axis and the row attention axis using vertical and horizontal iteration limits.

4. The automotive control system of claim 3, wherein the sampling in the adaptive-directional attention block includes applying horizontal and vertical shifts that constitute offset limits for the sampling along the column attention axis and the row attention axis.

5. The automotive control system of claim 1, wherein the pixel-level class predictions of the RD semantic segmentation mask include pixel-level class probabilities represented by an RD probability map, and the pixel-level class predictions of the RA semantic segmentation mask include pixel-level class probabilities represented by an RA probability map.

6. The automotive control system of claim 5, wherein the RD decoder and the RA decoder are trained using respective object-centric focal losses that weight binary cross-entropies between foreground and background in the RD probability map and the RA probability map, respectively.

7. The automotive control system of claim 5, wherein the RD decoder and the RA decoder are trained using respective intersection-based losses that penalize false-background predictions and false-foreground predictions in the RD probability map and the RA probability map, respectively.

8. The automotive control system of claim 5, wherein the RD decoder and the RA decoder are trained using respective Soft Dice losses based on respective ground truths and the RD probability map and the RA probability map, respectively.

9. The automotive control system of claim 5, wherein the RD decoder and the RA decoder are jointly trained using a Multi-View range matching loss based on the RD probability map and the RA probability map.

10. The automotive control system of claim 1, wherein the adaptive-directional attention block incorporates learnable parameters that perform a modulating operation to limit an effect of noise, allowing the adaptive-directional attention block to learn to suppress insignificant regions.

11. The automotive control system of claim 1, wherein the multiple frames of radar-domain feature maps correspond to a current time and one or more preceding times within a time interval ending at the current time.

12. A non-transitory computer-readable storage medium including computer executable instructions, wherein the instructions, when executed by a computer, cause the computer to perform a method for semantic segmentation in radar acquired image frames, the method comprising:

receiving radar signals from at least one radar sensor attached to a vehicle body panel of a vehicle;

deriving multiple frames of radar-domain feature maps from the radar signals, each frame including an Angle-Doppler (AD) feature map, a Range-Doppler (RD) feature map, and a Range-Angle (RA) feature map, wherein the AD feature map, the RD feature map, and the RA feature map of each frame are respective two-dimensional (2D) views of a corresponding three-dimensional (3D) Range-Angle-Doppler (RAD) cube;

encoding, using an AD neural network encoder, the AD feature maps of the multiple frames of radar-domain feature maps to generate encoded AD feature maps;

encoding, using an RD neural network encoder, the RD feature maps of the multiple frames of radar-domain feature maps to generate encoded RD feature maps;

encoding, using an RA neural network encoder, the RA feature maps of the multiple frames of radar-domain feature maps to generate encoded RA feature maps;

concatenating, in a channel-wise manner, the encoded AD feature maps, the encoded RD feature maps, and the encoded RA feature maps to obtain a multi-view latent feature map block;

using an adaptive-directional attention block, transforming the multi-view latent feature map block by sampling columns of the multi-view latent feature map block and applying self-attention to the sampled columns, and sampling rows of the multi-view latent feature map block and applying self-attention to the sampled rows;

using an RD decoder, decoding the transformed multi-view latent feature map block to generate an RD semantic segmentation mask corresponding to the RD feature maps, the RD semantic segmentation mask including pixel-level class predictions for the RD feature maps;

using an RA decoder, decoding the transformed multi-view latent feature map block to generate an RA semantic segmentation mask corresponding to the RA feature maps, the RA semantic segmentation mask including pixel-level class predictions for the RA feature maps; and identifying objects and determining a distance from the vehicle to each identified object based on the RD semantic segmentation mask and the RA semantic segmentation mask.

13. The computer-readable storage medium of claim 12, wherein the adaptive-directional attention block defines a column attention axis and a row attention axis for processing the multi-view latent feature map block.

14. The computer-readable storage medium of claim 13, wherein sampling the columns of the multi-view latent feature map block and sampling the rows of the multi-view latent feature map block include sampling along the column attention axis and the row attention axis using vertical and horizontal iteration limits.

15. The computer-readable storage medium of claim 14, wherein the sampling includes applying horizontal and vertical shifts that constitute offset limits of for the sampling along the column attention axis and the row attention axis.

16. The computer-readable storage medium of claim 12, wherein the pixel-level class predictions of the RD semantic segmentation mask include pixel-level class probabilities represented by an RD probability map, and the pixel-level class predictions of the RA semantic segmentation mask include pixel-level class probabilities represented by an RA probability map.

17. The computer-readable storage medium of claim 16, wherein the RD decoder and the RA decoder are trained using respective object-centric focal losses that weight binary cross-entropies between foreground and background in the RD probability map and the RA probability map, respectively.

18. The computer-readable storage medium of claim 16, wherein the RD decoder and the RA decoder are trained using respective intersection-based losses that penalize false-background predictions and false-foreground predictions in the RD probability map and the RA probability map, respectively.

19. The computer-readable storage medium of claim 16, wherein the RD decoder and the RA decoder are trained using respective Soft Dice losses based on respective ground truths and the RD probability map and the RA probability map, respectively.

20. The computer-readable storage medium of claim 12, wherein the adaptive-directional attention block incorporates learnable parameters, the method further comprising performing a modulating operation to limit an effect of noise, such that the adaptive-directional attention block learns to suppress insignificant regions.

* * * * *